United States Patent
Wu et al.

(10) Patent No.: US 7,764,416 B2
(45) Date of Patent: Jul. 27, 2010

(54) ELECTROCHROMIC DEVICE BASED ON LAYER BY LAYER DEPOSITION

(75) Inventors: Junjun Wu, Woodbury, MN (US); John E. Potts, Woodbury, MN (US); Jung-Sheng Wu, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 693 days.

(21) Appl. No.: 11/566,541

(22) Filed: Dec. 4, 2006

(65) Prior Publication Data
US 2008/0128286 A1    Jun. 5, 2008

(51) Int. Cl.
*G02F 1/15* (2006.01)
(52) U.S. Cl. .................................... 359/265
(58) Field of Classification Search ......... 359/265–275, 359/296; 424/46, 490; 428/304.4
See application file for complete search history.

(56) References Cited

U.S. PATENT DOCUMENTS

| | | | |
|---|---|---|---|
| 4,841,021 A | 6/1989 | Katritzky et al. | |
| 4,851,308 A * | 7/1989 | Akhtar | 429/306 |
| 4,898,923 A | 2/1990 | Katritzky et al. | |
| 5,203,978 A * | 4/1993 | Tsou et al. | 204/252 |
| 5,208,111 A | 5/1993 | Decher et al. | |
| 5,441,827 A | 8/1995 | Gratzel et al. | |
| 5,631,765 A * | 5/1997 | Baur et al. | 359/267 |
| 5,825,526 A | 10/1998 | Bommarito et al. | |
| 5,919,574 A | 7/1999 | Hoagland | |
| 6,144,479 A | 11/2000 | Lugg et al. | |
| 6,734,305 B2 | 5/2004 | Pierre et al. | |
| 6,791,738 B2 | 9/2004 | Reynolds et al. | |
| 6,846,565 B2 | 1/2005 | Korgel et al. | |
| 6,858,158 B2 | 2/2005 | Chittibabu et al. | |
| 6,861,014 B2 | 3/2005 | Fitzmaurice et al. | |
| 6,870,657 B1 | 3/2005 | Fitzmaurice et al. | |
| 7,333,257 B2 | 2/2008 | Reynolds et al. | |
| 2003/0152703 A1 | 8/2003 | Hammond et al. | |
| 2004/0013934 A1 | 1/2004 | Olson | |
| 2004/0053037 A1 | 3/2004 | Koch et al. | |
| 2004/0150866 A1 | 8/2004 | Tench et al. | |
| 2004/0233537 A1 | 11/2004 | Agrawal et al. | |
| 2006/0097233 A1 | 5/2006 | Pichot et al. | |
| 2007/0051403 A1 * | 3/2007 | Itami | 136/263 |
| 2008/0013152 A1 | 1/2008 | Hirano et al. | |

FOREIGN PATENT DOCUMENTS

EP    1535952 A1    6/2005

(Continued)

OTHER PUBLICATIONS

G. Decher, J. D. Hong and J. Schmitt, Thin Solid Films, 210-211 (1992) 831.

(Continued)

*Primary Examiner*—Ricky L Mack
*Assistant Examiner*—Tuyen Q Tra

(57) ABSTRACT

An electrode is described. The electrode includes a substrate having a first and a second surface, a conductive layer, multilayer structure having alternating layers of at least one polymer layer and at least one electroactive chemical bound nanoparticle layer. The conductive layer is disposed on the second surface of the substrate, and the multilayer structure is disposed on the conductive layer.

21 Claims, 11 Drawing Sheets

FOREIGN PATENT DOCUMENTS

| KR | 2002-0077512 | | 10/2002 |
|---|---|---|---|
| KR | 2006-0082932 | | 7/2006 |
| WO | WO 02075826 A2 | | 9/2002 |
| WO | WO 2004067672 A1 | | 8/2004 |
| WO | WO 2004067673 | | 8/2004 |
| WO | WO2008/055311 | * | 5/2008 |

OTHER PUBLICATIONS

M. Ferreira, J. H. Cheung, M. F. Rubner, Thin Solid Films, 244 (1994) 806.

J. H. Cheung, A. F. Fou, M. F. Rubner, Thin Solid Films, 244 (1994) 985.

M. Ferreira, M. F. Rubner, Macromolecules, 28 (1995) 7107.

A. C. Fou, M. F. Rubner, Macromelcules, 28 (1995) 7115.

J. H. Cheung, W. B. Stockton, M. F. Rubner, Macromolecules, 30 (1997) 2712.

D. Wakizak, T. Fushimi, H. Ohkita, S. Ito, Polymer, 45 (2004) 8561.

Cinnsealach, R., Boschloo, G., Rao, S.N., Fitzmaurice, D. *Sol. Energy Mater. Sol. Cells* 1999, 57, 107.

C. A. Cutler, M. Bouguettaya, J. R. Reynolds, Adv. Mater., 14 (2002) 684.

D. Laurent, J. B. Schlenoff, Langmuir, 13 (1997) 1552.

D. M. DeLongchamp, M. Kastantin, P. T. Hammond, Chem. Mater. 15 (2003) 1575.

D. M. DeLongchamp, P. T. Hammond, Chem. Mater. 16 (2004) 4799.

X. Hong, J. Li, M. Wang, J. Xu, W. Guo, J. Li, Y. Bai, T. Li, Chem. Mater. 16 (2004) 4022.

T-H Kim, B-H Sohn, Appl. Surf. Sci. 201 (2002) 109.

O. Crespo-Biel, B. Dordi, D. N. Reinhoudt, J. Huskens, J. Am. Chem. Soc. 127 (2005) 7594.

W. B. Stockton, M. F. Rubner, Macromolecules 30 (1997) 2717.

S. Y. Yang, M. F. Rubner, J. Am. Chem. Soc., 124 (2002) 2100.

S. Bai, Z. Wang, X. Zhang, Langmuir, 20 (2004) 11828.

D. M. DeLongchamp, P. T. Hammond, Langmuir, 20 (2004) 5403.

Y. Shimazaki, M. Mitsuishi, S. Ito, M. Yamamoto, Langmuir, 13 (1997) 1385.

X. Wang, K. Naka, H. Itoh, T. Uemura, Y. Chujo, Macromolecules, 36 (2003) 533.

D. Li, Y. Jiang, Z. Wu, X. Chen, Y. Li, Thin Solid Films, 360 (2000) 24.

T. Moav, A. Hatzor, H. Cohen, J. Libman, I. Rubinstein, A. Shanzer, Chem. Eur. J., 4 (1998) 502.

A. Hatzor, T. Van der Boom-Maov, S. Yochelis, A. Vaskevich, A. Shanzer, I. Rubinstein, Langmuir 16 (2000) 4420.

T. Serizawa, S. Hashiguchi, M. Akashi, Langmuir, 15 (1998) 5363.

P. Kohli, G. J. Blanchard, Langmuir, 16 (2000) 8518.

Y. Lvov, K. Ariga, I. Ichinose, T. Kunitake, J. Chem. Soc., Chem. Commun., (1995) 2313.

J. Anzai, Y. Kobayashi, N. Nakamura, M. Nishimura, T. Hoshi, Langmuir, 16 (2000) 2851.

I. Suzuki, Y. Egawa, Y. Mizukawa, T. Hoshi, J. Anzai, J. Chem. Soc., Chem. Commun. (2002) 164.

Kim, J.H.; Shiratori, S.; "Characterization of $TiO_2$/Polyelectrolyte Thin Film Fabricated by a Layer-by-Layer Self-Assembly Method", Japanese Journal of Applied Physics, vol. 44, No. 10, 2005, pp. 7588-5792.

Grunlan, J.C.; "Fast-Switching, High-Contrast Electrochromic Thin Films Prepared Using Layer-by-Layer Assembly of Charged Species", Mater. Res. Soc. Symp. Proc., vol. 846, 2005 Materials Research Society, pp. DD11.2.1-DD11.2.6.

Xue, B.; Peng, J.; Xin, Z.; Kong, Y.; Li, L.; Li, B.; "High-contrast electrochromic multilayer films of molybdenum-doped hexagonal tungsten bronze ($Mo_{0.05}$-HTB)", Journal of Materials Chemistry, 2005, 15, pp. 4793-4798.

Liu, Y.; Wang, A.; Claus, R.; "Molecular Self-Assembly of $TiO_2$/Polymer Nanocomposite Films", J. Phys. Chem. B, vol. 101, No. 8, 1997, pp. 1385-1388.

Kim, E.; Jung, S.; "Layer-by-Layer Assembled Electrochromic Films for All-Solid-State Electrochromic Devices", Chem. Mater., vol. 17, No. 25, 2005, pp. 6381-6387.

Zacharia, N.; Hammond, P.T.; "Electrchromism of LBL Assembled Thin Polymer Films Containing Metal Oxide Nanoparticles", Polmeric Materials: Science & Engineering, 2003, 89, pp. 589.

Wang, Z.; Sasaki, T.; Muramatsu, M. Ebina, Y.; Tanaka, T.; Wang, L.; Watanabe, M.; "Self-Assembled Multilayers of Titania Nanoparticles and Nanosheets with Polyelectrolyes", Chem. Mater., vol. 15, No. 3, 2003, pp. 807-812.

* cited by examiner

ELECTROCHROMIC DEVICE BASED ON LAYER BY LAYER DEPOSITION

BACKGROUND

The invention relates to electrochromic displays, particularly those that are manufactured by layer by layer deposition.

Electrochromic materials undergo a reversible change of color due to their oxidation or reduction. Devices incorporating these materials have been utilized in the construction of mirrors, displays, and windows for example. Nanoparticle based films can be useful in many electrochemical applications, examples of which include electrochromic devices, batteries, and solar cells. In order to control and fine tune such devices that include nanoparticle based films, it can be desirable to form uniform films. Currently utilized methods do not necessarily provide films with these characteristics, often lack the ability to precisely control the film composition and thickness, are difficult to produce films on a large scale, and are generally not amenable to low temperature processing. Therefore, there remains a need for methods of producing such films, components for producing the films, and the films produced thereby.

BRIEF SUMMARY

The invention includes an electrode having a substrate having a first and a second surface; a conductive layer, a multilayer structure comprising alternating layers of at least one polymer layer and at least one electroactive chemical bound nanoparticle layer wherein the conductive layer is disposed on the second surface of the substrate, and the multilayer structure is disposed on the conductive layer.

The invention also includes an electrochromic article having an electrode having a substrate having a first and a second surface; a conductive layer; a multilayer structure comprising alternating layers of at least one polymer layer and at least one electroactive chemical bound nanoparticle layer wherein the conductive layer is disposed on the second surface of the substrate, and the multilayer structure is disposed on the conductive layer; and an electrolyte layer disposed on the multilayer structure.

The invention also includes a method of forming a multilayer thin film that includes preparing a dispersion having nanoparticles having an average size from 5 nm to 30 nm; and at least one electroactive chemical, wherein the electroactive chemical binds to the surface of the nanoparticles, the dispersion includes agglomerates of the electroactive chemical bound nanoparticles, and a majority of the agglomerates have an average diameter that is not greater than 1 micrometer; providing a polymer solution; providing a substrate; applying the polymer solution to the substrate; and applying the dispersion to the substrate.

The invention also includes an article having a substrate; and a multilayer structure having at least one layer formed from a dispersion that includes nanoparticles having an average size from 5 nm to 50 nm; and at least one electroactive chemical, wherein the electroactive chemical binds to the surface of the nanoparticles; the dispersion includes agglomerates of the electroactive chemical bound nanoparticles, and a majority of the agglomerates have an average diameter that is not greater than 1 micrometer; and at least one layer formed from a polymer solution.

DETAILED DESCRIPTION

Figure 1:
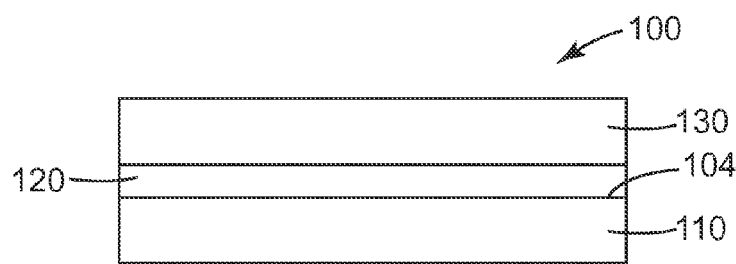
FIG. 1 depicts an exemplary electrode in accordance with an embodiment.

As used herein, "average diameter" refers to the average nominal diameter of the nanoparticles. Instances where particles with at least two average diameters are utilized, refers to the use of two separate particle compositions having at least two different average diameters.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a nanoparticle layer" includes two or more nanoparticle layers.

The invention includes the formation of a multilayer film through layer by layer deposition. As used herein, a multilayer film refers to a structure having two or more layers or two or more bilayers. Multilayer films that are fabricated by such a method can also be referred to as composite thin films.

Generally, a method of fabricating a multilayer film via layer by layer deposition includes preparing a dispersion; providing a polymer solution; providing a substrate; applying the polymer solution to the substrate; and applying the dispersion to the substrate.

Dispersions utilized herein include nanoparticles. In one embodiment, any nanoparticle that can function to provide reversible electron transport through a structure of the nanoparticles can be utilized. In one embodiment, nanoparticles can be chosen based on at least two competing, but desirable, characteristics of a final layer that can be created with the dispersion; the porosity of the layer and the surface area per unit geometrical area of the particle layer. For example, in an instance where the electrode will ultimately be used in an electrochromic device, the porosity and the pore size of the layer contributes to the switching speed by permitting passage of the mobile ionic components in the electrolyte, and the surface area contributes to the contrast. It is generally desirable to have an electrochromic device that has a high contrast ratio. This provides a display that has a strong, vivid color (when the electroactive chemical is in one oxidation state) in comparison to the white or off white non-color (when the electroactive chemical is in the other oxidation state). It is also generally desirable to have an electrochromic display that has a fast switching speed from one color to another; generally from white (when a white background is used) to a color and vice versa (the switch from colored to white state can also be referred to as bleaching). With respect to nanoparticles that are utilized in the invention, generally, use of smaller diameter particles will provide a larger surface area that may ultimately provide a higher contrast ratio. In contradiction to that, the use of larger particles will provide a layer having larger average pore size, which may ultimately provide faster switching speeds by providing easy access to the ions in the electrolyte. These two opposing characteristics also play a role, albeit with different manifestations, in other applications.

Nanoparticles that are useful include semiconductive or conductive nanoparticles. Exemplary nanoparticles that can be utilized can be represented by the following general formula: $M_aX_b$ wherein M is a metal atom, including but not limited to, zinc (Zn), cadmium (Cd), mercury (Hg), indium (In), gallium (Ga), titanium (Ti), tungsten (W), lead (Pb), zirconium (Zr), vanadium (Va), niobium (Nb), tantalum (Ta), silver (Ag), cerium (Ce), strontium (Sr), iron ($Fe^{2+}$ or $Fe^{3+}$) nickel (Ni) or a perovskite thereof, and X can include, but is not limited to, oxygen (O), sulfur (S), selenium (Se), tellurium (Te), phosphorus (P), arsenic (As), and nitrogen (N); and a and b are stochiometric numbers. Mixtures of metal atoms may also be utilized as nanoparticles.

Specific examples of nanoparticles that can be utilized include, but are not limited to zinc oxide (ZnO), zinc sulfide (ZnS), zinc selenide (ZnSe), zinc tellurium (ZnTe), cadmium oxide (CdO), cadmium sulfide (CdS), cadmium selenide (CdSe), cadmium tellurium (CdTe), mercury sulfide (HgS), mercury selenide (HgSe), mercury tellurium (HgTe), indium phosphide (InP), indium arsenide (InAs), gallium nitride (GaN), gallium phosphide (GaP), gallium arsenide (GaAs), titanium dioxide ($TiO_2$), tungsten trioxide ($WO_3$), antimony oxide (SbO), tin oxide (SnO), lead sulfide (PbS), and lead selenide (PbSe). In one embodiment metal oxides represented as $MO_x$, wherein M is as defined above, and x is an integer from 1 to 3, are utilized. In another embodiment titanium dioxide ($TiO_2$) is utilized as the nanoparticle.

Nanoparticles that are useful generally have an average diameter that is from 5 nanometers (nm) to 50 nm. In one embodiment, from 5 nm to 30 nm. In one embodiment, from 7 nm to 21 nm. In one embodiment where the nanoparticles are $TiO_2$, a commercially available nanoparticle with an average diameter of 21 nm is P25, available from Degussa AG (Dusseldorf, Germany). In one embodiment, nanoparticles with an average diameter of 7 nm are utilized. In one embodiment where the nanoparticles are $TiO_2$, a commercially available nanoparticle with an average diameter of 7 nm is ST-01, available from Ishihara Corporation (USA)(San Francisco, Calif.). In yet another embodiment, nanoparticles with two different average diameters are utilized in one dispersion. In yet a further embodiment, particles with an average diameter of 7 nm and particles with an average diameter of 21 nm are utilized. In one embodiment where the nanoparticles are $TiO_2$ nanoparticles, a commercially available nanoparticle with an average diameter of 7 nm, referred to as ST-01 and a commercially available nanoparticle with an average diameter of 20 nm, referred to as ST-21, are available from Ishihara Corporation (USA)(San Francisco, Calif.).

Generally, smaller nanoparticles will provide larger specific surface area than will larger nanoparticles. The specific surface area of a particle is the total surface area per volume or weight of a solid. Specific surface areas are reported herein as square meter per gram ($m^2/g$). Generally, nanoparticles that can be utilized have a specific surface area of at least 20 $m^2/g$. In one embodiment, nanoparticles that can be utilized have a specific surface area of at least 50 $m^2/g$. In another embodiment nanoparticles that can be utilized have a specific surface area of 50 $m^2/g$ to 300 $m^2/g$. Some embodiments will include the use of two different diameter nanoparticles that have specific surface areas of 50 $m^2/g$ and 300 $m^2/g$ respectively.

As mentioned above, as smaller diameter nanoparticles are used in a dispersion, the specific surface area of the nanoparticles increases, and for example, the contrast ratio of an electrochromic display that is fabricated using that dispersion can be higher than an electrochromic display that is fabricated using a dispersion with lower specific surface area particles (assuming the layer thicknesses are the same). Also, as smaller diameter nanoparticles are used in a dispersion, the pore size of the channels within a layer that is formed using that dispersion decreases. The channels permit the movement of ions through the electrolyte during device operation. For example, an electrochromic display that includes such a layer can have a slower switching speed than an electrochromic display that is fabricated using a dispersion with larger diameter nanoparticles. As seen here, these two exemplary desirable properties of an electrochromic display have to be weighed against each other when determining the size of the nanoparticle that is to be used when fabricating a device using a dispersion.

In an embodiment where nanoparticles having two different average diameters are utilized, the ratio of the amounts of the two particles is chosen based on the consideration of two different properties of the final film or device (contrast vs. switching speeds). Larger ratios (or amounts) of larger particles will increase the average pore size of a final layer, but will decrease the specific surface area of the particles which decreases the amount of electroactive chemical bound to the particles. Conversely, larger ratios (or amounts) of smaller particles will decrease the average pore size of a final layer, but will increase the specific surface area of the particles which increases the amount of electroactive chemical bound to the particles. In an embodiment where the dispersion will be used to create a film or layer that is used in an electrochromic device, larger amounts of larger particles will therefore increase the switching speed, and decrease the contrast ratio; and larger amounts of smaller particles will therefore decrease the switching speed, and increase the contrast ratio.

Generally dispersions utilized herein include nanoparticles in an amount that is capable of providing layers or coatings with desired properties. It will be understood by one of skill in the art, having read this specification that the amount of nanoparticles present in a dispersion can depend, at least in part, on the particle size of the nanoparticles. For example, if smaller particles, i.e. particles having a greater specific surface area are utilized, a smaller weight percent of the nanoparticles can be utilized in a dispersion.

In one embodiment, a dispersion includes not more than 50 wt-% of nanoparticles. In another embodiment, a dispersion includes not more than 40 wt-% of nanoparticles. In one embodiment the nanoparticles are present in an amount from 30 to 40 wt-% of the dispersion.

Dispersions utilized herein also include electroactive chemicals. Electroactive chemicals include chemicals that can be used as the active species in electrochemical devices such as photovoltaic cells, electrochromic displays and batteries.

When used in a dispersion, a suitable electroactive chemical should be capable of binding to the surface of the nanoparticle. This binding can be based on the particular structure of the electroactive chemical, the atomic structure of the nanoparticle, the nanostructure of the nanoparticle agglomerates, a surface treatment that is applied to the nanoparticle, or some combination thereof. In one embodiment, the surface of the nanoparticles is capable of binding the electroactive chemical due to a functional portion of the electroactive chemical. For example, the surface of the nanoparticles can be capable of binding an electroactive chemical that includes a specific chemical group. Exemplary chemical groups that can be included in electroactive chemicals include, but are not limited to, phosphonate groups, carboxylate groups, and sulfonate groups. Such exemplary groups can bind to $Ti^{+4}$ sites on the $TiO_2$ nanoparticle surfaces. In such an embodiment, both charge interaction and chemical bonding may be taking place between the $TiO_2$ particles and the electroactive chemicals. In one embodiment, electroactive chemicals that include phosphonate groups are utilized.

Electroactive compounds which may be utilized in dispersions include, but are not limited to photosensitizers, electrochromophores, other redox species, and electroluminescent molecules.

Exemplary electroactive chemicals for use in forming dispersions to fabricate electrochromic devices include, but are not limited to ruthenium (II) complexes, polyanilines, polypyridyl complexes, viologen, and derivatives thereof. Exemplary electroactive chemicals for use in electrochromic devices also include those disclosed and exemplified in U.S. Pat. Nos. 4,841,021; and 4,898,923, the disclosures of which are incorporated herein by reference.

In an embodiment where the dispersion can be used to fabricate an electrochromic device, one possible electroactive chemical includes viologen or derivatives thereof. Further information regarding viologen can be found in: The Viologens, Physicochemical Properties, Synthesis and Applications of the Salts of 4,4'-Bipyridine", Author: P. M. S. Monk, Publisher: John Wiley & Sons, 1998. Viologen, as referred to herein includes viologen and derivates thereof and can be represented by Formula I below:

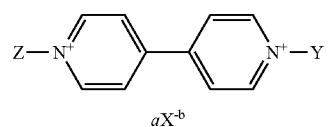

Formula 1 wherein at least one of Z and Y has a functional group that can bind to a surface of a nanoparticle in the dispersion;
a is 1 or 2; and
b is 1 or 2, with the proviso that $aX^{-b}$ balances the charge of the two $N^+$ in the rings.

In one embodiment, Z and Y independently contain a phosphonate group, a carboxylate group, or a sulfonate group. In one embodiment, X is chloride, fluoride, iodide, or bromide; a is 2; and b is 1.

One specific example of a modified viologen that can be utilized in a dispersion includes 1,1'-bis(2-phosphonoethyl)-4,4'-bipyridinium dichloride, the structure of which is given below.

It is thought, but not relied upon, that, in a dispersion that utilizes a modified viologen (as exemplified above) and $TiO_2$ nanoparticles, the strong interaction between the phosphonate groups of the viologen and the $TiO_2$ surface binds the viologen molecules covalently to the surface of the $TiO_2$ nanoparticles.

Exemplary photosensitizers that can be used as electroactive chemicals in dispersions that can be utilized to form solar cells, include but are not limited to, the family of ruthenium (II) complexes widely used in dye sensitized solar cells (DSSC); such as bis(2,2'-bipyridine)(2,2'-bipyridine-4,4'-dicarboxylic acid)ruthenium(II) complex, other metal-containing dyes such as, for example, cis-bis(isothiocyanato)bis(2,2'-bipyridyl-4,4'-dicarboxylato)-ruthenium(II)("N3 dye"); tris(isothiocyanato)-ruthenium(II)-2,2':6',2'-terpyridine-4,4', 4'-tricarboxylic acid; cis-bis(isothiocyanato)bis(2,2'-bipyridyl-4,4'-dicarboxylato)-ruthenium(II) bis-tetrabutylammonium; cis-bis(isocyanato)(2,2'-bipyridyl-4,4' dicarboxylato) ruthenium (II); and tris(2,2'-bipyridyl-4,4'-dicarboxylato)ruthenium (II) dichloride; anthocyanins, porphyrins, phthalocyanines, merocyanines, cyanines, squarates, eosins (most are commercially available from Solaronix, Switzerland). Other photosensitizing dyes including those with appropriate anchoring groups that can bind to the surface of the nanoparticles can also be utilized.

Generally, the amount of the electroactive chemical that is in a dispersion is at least partially dependent on the surface area of the nanoparticle in the dispersion because the electroactive chemical binds to the surface of the nanoparticle. Therefore, the more overall nanoparticle surface area there is in a dispersion, either due to the amount of nanoparticles in the dispersion or the size of the nanoparticles, the more electroactive chemical that can bind to the surface of the nanoparticles. Conversely, once enough electroactive chemical is provided in the dispersion to bind to all of the active portions of the surface of the nanoparticles, any excess electroactive chemical will participate in the equilibrium that will develop between the electroactive chemical in solution and that which is bound to the surface of the nanoparticle. One of skill in the art, having read this specification will also understand that the equilibrium that is established between the bound and free electroactive chemical can be affected by the pH and or ionic strength of the solution.

Generally, the electroactive chemical is utilized in solution. In one embodiment, the electroactive chemical is an aqueous solution when it is mixed with the nanoparticles. Other polar solvents, such as methanol, ethanol, methoxy-2-propanol, or mixtures thereof can also be utilized. In one embodiment, the pH, or ionic strength of the solution can be modified before the solution is mixed with the nanoparticles.

In one embodiment, the electroactive chemical can be present from 1 millimolar (mM) to 100 mM. In another embodiment, the electroactive chemical can be present from 10 mM to 100 mM. In another embodiment, the electroactive chemical can be present from 20 mM to 75 mM. In yet another embodiment, the electroactive chemical can be present from 20 mM to 50 mM when combined in a solution having P25 $TiO_2$ at 30 wt-% to 40 wt-%.

Dispersions that are utilized will include agglomerates. Agglomerates form when two or more particles bind together during and/or after particle synthesis either through van der Waals forces, chemical bonding, or a combination thereof. Agglomerates in the dispersion will have different, non-uniform diameters. Generally, dispersions that can be utilized have a majority of agglomerates that have submicron average diameters. Often, dispersions that can be utilized will have a bimodal or monomodal distribution of the diameter of agglomerates. However, regardless of the distribution, dispersions that are utilized have more agglomerates that have a submicron diameter than those with larger diameters. In one embodiment, a dispersion that can be utilized includes a majority of agglomerates that have an average diameter that is not greater than 1 μm. In one embodiment, a dispersion that can be utilized includes a majority of agglomerates that have an average diameter that is not greater than 500 nm. In another embodiment, a dispersion that can be utilized includes a majority of agglomerates that have an average diameter that is not greater than 100 nm.

Generally, dispersions with smaller agglomerate sizes tend to form layers that have more controlled and/or reproducible structures. More specifically, dispersions with smaller agglomerate sizes can tend to form layers that have a more controlled porosity, perhaps not a higher porosity, but more reproducible. Dispersions with smaller agglomerate sizes and narrower size distribution also tend to form layers with less surface roughness. Porosity of a layer can be important in instances where the layers are to be part of an electrochromic device for example, because porosity and pore size contribute to a fast and/or reproducible switching speed of the final electrochromic device. Solutions with smaller agglomerate size can also tend to form layers that have a more constant surface coverage of electroactive chemical. Otherwise, the internal surface in large agglomerates is not accessible to electroactive chemicals, thus resulting in lower surface coverage. Surface coverage of electroactive chemical can be important because high surface coverage of viologen, for example can also contribute to the switching speed of a final electrochromic device. Smaller agglomerate sizes can also contribute to reproducibly being able to control the thickness of the layers that are formed with the solution. In one embodiment, this can contribute to creating an electrochromic device with a good contrast ratio.

Agglomerate size of a solution can be determined as is well known to those of skill in the art. One exemplary method of determining agglomerate size includes use of a Diffraction Particle Size Analyzer, such as a LA-910 Laser Scattering Particle Size Distribution Analyzer (Horiba Instruments, Inc., Irvine, Calif.).

In one embodiment a dispersion is formed by initially mixing the nanoparticles with a solution containing the electroactive chemical and then dispersing the mixture by high shear force or attrition. One of skill in the art will understand that the mixing and dispersing step can be carried out in one step or in multiple steps. During these steps, the electroactive chemical binds to the surface of the nanoparticles. The resultant solution or dispersion has an agglomerate size that is in the submicron range, as discussed above.

The initial mixing step can be accomplished using any method known to those of skill in the art, including but not limited to, the use of a mixing device. The function of the initial mixing step is to create a dispersion that is flowable on a large scale and reduce the large agglomerates for further processes. One of skill in the art, having read this specification, will also understand that the initial mixing step can be eliminated and the step of dispersing the materials in the dispersion can function to create a homogenous solution.

After the initial mixing of the nanoparticles with the solution containing the electroactive chemicals, the mixture is dispersed. Generally, the function of the dispersing step is to form a dispersion, including a majority of agglomerates with a submicron diameter. Any method that can produce such a solution from the starting materials can be utilized herein. Generally, solutions containing nanoparticles with diameters of less than 20 nm will form solutions that have a majority of agglomerate sizes that are greater than submicron if a dispersion step is not utilized. The dispersion step can be accomplished using any method known to those of skill in the art, including but not limited to, the use of a microfluidizer® (Microfluidics Corp. Newton, Mass. for example), homogenizer (Gaulin 15 MR-8TA homogenizer from APV Gaulin, Minneapolis, Minn., for example), media mill (MiniCer from Netzsch Incorporated, Exton, Pa. for example), high shear mixing (Ulta-Turrax mixer from IKA Works, Inc. Wilmington Del., for example), or ultrasonicator (Misonix, Farmingdale, N.Y. or VirSonic Ultrasonic, VirTis—an SP Industries Company, Gardiner N.Y. for example).

In one embodiment, the dispersing step is accomplished by using a microfluidizer® from Microfluidics (Newton, Mass.) with serial 250 μm and 85 μm interaction chambers operated at about 10,000 to 30,000 psi for up to 8 to 16 passes. The final agglomerate size and size distribution can be easily controlled by either adjusting the pressure or the number of passes.

It should be noted that electroactive chemical bound nanoparticle dispersions can be used to form films or layers of nanoparticle/electroactive chemical without further processing. For example, it is not necessary to isolate the agglomerates, dry them, and/or redissolve them in order to use them in the fabrication of films or layers. It is thought, but not relied upon that this extra processing step is not necessary because the agglomerate size in the dispersion is controlled. Elimination of further processing steps can offer an advantage in process time, efficiency and economics.

Once a dispersion is prepared, it is generally a stable solution. As used herein, a stable solution refers to a solution that does not have particles falling out of solution (precipitating), or creating a two phase solution. Solutions that are stable also have agglomerates that remain suspended in solution. A stable solution also does not change viscosity during non-use or storage. As used herein, a stable solution does not refer to any electrical properties of the electroactive chemical. Generally, dispersions of the invention are stable for at least one day. In another embodiment, dispersions of the invention are stable for at least one week. In another embodiment, dispersions of the invention are stable for at least one month or longer.

A method of forming a multilayer film also includes a step of providing a polymer solution. The polymer solution that is utilized includes a material that has a charge opposite of the agglomerates in the dispersion. Another method of explaining the relationship between the polymer solution and the dispersion is that one contains polycations, and one that contains polyanions. For example, the dispersion may have positively charged agglomerates, for example it could contain $TiO_2$ nanoparticles with a modified, positively charged viologen bound to the surface; then the polymer solution should have a negative charge. Any solution that includes polymers that have an opposite charge to that of the nanoparticle/electroactive chemical dispersion agglomerates, can conduct electrons, and can provide some mechanical strength to the final multilayer structure can be utilized as the polymer solution.

In one embodiment, polymer solutions that are useful are generally conjugate polymer solutions. Exemplary polymers include, but are not limited to polyacetylenes, poly(para-phenylenes) (PPA), poly(para-phenylene-vinylene)(PPV), polypyrroles, polythiophenes, polyanilines, polyfluorenes, poly(3-hexyl-thiophenes), polynaphthalenes, poly(p-phenylene sulfides), poly(3,4-alkylendioxythiophene)(PXDOT) derivatives. Specific examples include polymers based on poly(3,4-ethylenedioxythiophene)(PEDOT), and its derivatives, such as poly 3,4-ethylenedioxythiophene/poly(4-styrenesulfonate)(PEDOT:PSS), and dimethyl substituted poly(3,4-propylenedioxythiophene)(PPropOT-$Me_2$). An exemplary PEDOT:PSS solution is commercially available from H.C. Stark (Newton, Mass.), under the tradename Baytron®-PHC V4. Other conductive Baytron®-P polymers can also be utilized. In one embodiment, a solution having from 0.1 to 20 mM PEDOT:PSS can be utilized. In another embodiment, a solution having from 1 to 10 mM PEDOT:PSS can be utilized. In yet another embodiment a solution having 2 mM PEDOT:PSS can be utilized.

A method of forming a multilayer film also includes providing a substrate. The substrate that will be used will depend at least in part on the final application and purpose of the device that is being fabricated. In one embodiment, the substrate can be transparent. The substrate can either be rigid or flexible. The methods provided herein offer the advantage of utilizing low drying temperatures which allows plastic substrates to be utilized. In one embodiment, the substrate can be coated with a functional material, such as a transparent conductive material. In one embodiment, the substrate (whether coated with a conductive material or not) can optionally be surface treated to provide a charged surface. In one embodiment, the substrate is optionally surface treated to provide a positively charged surface. In such an embodiment, the surface can optionally be pre-treated to create a positively charged surface that a negatively charged polymer solution will adsorb onto. In one embodiment, a substrate, either glass or plastic, can be pre-treated with aminopropyl triethoxysilane (APS) to provide a positively charged surface. As mentioned above, this step is optional because, negatively charged polymer solutions will adsorb strongly onto surfaces, such as indium tin oxide (ITO) coated surfaces. A substrate that is optionally surface treated to provide a positively charged surface can have a negatively charged layer applied thereto initially. Alternatively, the opposite configuration could also be utilized.

The applications of the polymer solution and the dispersion to the substrate can be accomplished as one of ordinary skill in the art would recognize, having read this specification. Generally, the polymer solution and the nanoparticle/electroactive chemical dispersion will be electrostatically absorbed on the substrate. Examples of such application methods include, dip coating, spray coating, and die coating. Any of these methods could also be utilized as a continuous coating process. One example of a continuous process for manufacturing electrostatically self-assembled coatings includes U.S. patent Publ. No. 2004/0157041, the disclosure of which is incorporated herein by reference. In one embodiment of the invention, the polymer solution and the dispersion are applied to the substrate using dip coating. One of skill in the art, having read this specification, would be aware of specific methods for carrying this out.

In one embodiment, excess polymer, agglomerate, or solvent; materials for which there is not room (either physically not room, or based on the charges present) on the surface, or materials which should not be there (i.e. solvent); can be allowed to dissipate before application of subsequent polymer solution or dispersion. In one embodiment, this dissipation can occur via drying. During drying, solvent that is present in or on a layer that has been applied can be removed from the layer via evaporation. In one embodiment, this dissipation can occur via rinsing. During rinsing, solvent that is present in or on a layer, or excess polymer solution or agglomerate can be removed from the surface and dissipate into the rinsing material. In yet another embodiment, both rinsing and drying can be utilized between applications of layers. In one embodiment the substrate is rinsed and dried between the applications of polymer solution and dispersion. Removing solvent in the layers can be advantageous because it may make the polymer or agglomerate denser, and may also prevent mingling between the layers via the polymer solution or dispersion dissolving in remaining solvent and migrating from one layer to another. Solvent present in the layers may also diminish the strength at which the polymer or agglomerates are bound to the substrate, and thereby decrease the mechanical strength of the final structure.

Applications of polymer solution followed or proceeded by the nanoparticle/electroactive chemical dispersion gives a self assembly method for the fabrication of the multilayer structures. The opposite charges of the polymer and agglomerates provide the adhesion between the layers, and facilitate a self assembly process. Generally, the multilayer structure will create an interconnected porous network of both layers. This interconnection makes these multilayer structures ideal for electrical applications because they have the ability to conduct electrons or holes and ions needed from the electrolyte for charge compensation across the entire multilayer structure. In an exemplary embodiment of the invention that includes a modified viologen as the electroactive chemical, the viologen can switch properties, i.e. color, via the charge that is transported through the conductive network of the multilayer structure.

The thickness of each of the polymer and nanoparticle/electroactive chemical layers can be dictated, at least in part by the concentrations of the polymer solution and the dispersion that are applied to the substrate, and the application parameters. Thicker layers can be obtained by using more concentrated solutions during dip coating for example. It has specifically been found that there is a linear relationship between the film thickness and the concentration of the nanoparticle/electroactive chemical; as well as between the thickness and the number of layers formed from both polymer solution and nanoparticle/electroactive chemical. The time of coating, for example, can also play a role in the thickness of the layer that is formed.

Generally, the dispersion containing nanoparticles and electroactive chemical and a polymer solution can be used as discussed above to create a bilayered structure of alternating polymer layers and nanoparticle/electroactive chemical layers. As used herein, a bilayer refers to a layer of polymer solution that is in association with a layer of nanoparticle/electroactive chemical or vice versa. As used herein, one bilayer makes up one layer of a multilayered structure. In one embodiment, an article having at least one layer; at least one bilayer of polymer and nanoparticle/electroactive chemical is utilized. In another embodiment, an article having more than one layer; more than one bilayer of polymer and nanoparticle/electroactive chemical is utilized. In yet another embodiment, an article having at least 5 layers; at least 5 bilayers of polymer and nanoparticle/electroactive chemical is utilized. In yet another embodiment, an article having at least 10 layers; at least 10 bilayers of polymer and nanoparticle/electroactive chemical is utilized. In a further embodiment, an article having at least 40 layers; 40 bilayers of polymer and nanoparticle/electroactive chemical is utilized.

Generally, the dispersion containing nanoparticles and electroactive chemical and a polymer solution can be used as above to create a multilayered structure of alternating polymer and nanoparticle/electroactive chemical layers having specified thicknesses. Generally, each layer can be fabricated to have a specific thickness. In one embodiment, the thickness of all the layers in one multilayer structure is the same. In another embodiment, the thickness of all polymer layers are the same thickness and the thickness of all nanoparticle/electroactive chemical layers are the same thickness; and the thickness of the polymer layers need not, but can be, the same as the thickness of the nanoparticle/electroactive chemical layers.

In one embodiment, a substrate is treated in order to modify the surface before a nanoparticle/electroactive chemical dispersion is applied to the substrate. In one embodiment, a nanoparticle/electroactive chemical dispersion creates the first layer of a multilayer film on a substrate. In one embodiment, a polymer layer creates the first layer of a multilayer film on a substrate. In another embodiment, a nanoparticle/electroactive chemical dispersion creates a second or subsequent layer of a multilayer film on a substrate. In one embodiment, a negatively charged polymer solution is coated onto the substrate before a positively charged nanoparticle/electroactive chemical dispersion is coated thereon.

The layer that is formed form the polymer solution can exhibit various morphologies depending on the polymer solution concentration and coating process. It can range from isolated polymer colloids to interconnecting polymer networks. Generally, the polymer layers function to give mechanical strength and cohesion to the multilayer structure. The polymer layer also functions to conduct either holes or electrons through it and to another nanoparticle/electroactive chemical layer or subsequent structures in the device.

The nanoparticle/electroactive chemical layer, which is also referred to as the nanoparticle with bound electroactive chemical layer, that is formed from the dispersion is a porous layer of interconnected particles. In one embodiment, the average pore size in a nanoparticle with bound electroactive chemical layer is at least 5 nm. In another embodiment, the average pore size in a nanoparticle with bound electroactive chemical layer is at least 10 nm. Generally the nanoparticle/electroactive chemical and polymer layers function to conduct electrons or holes through the porous portions of the nanoparticle structure to the electroactive chemical bound thereon so it can be electrically modified (i.e. reduced or oxidized for example).

One embodiment includes an article having a substrate; and a multilayered structure that includes at least one layer formed from a solution that includes nanoparticles having an average size from 5 nm to 50 nm; and at least one electroactive chemical, wherein the electroactive chemical binds to the surface of the nanoparticles the dispersion includes agglomerates of the electroactive chemical bound nanoparticles, and a majority of the agglomerates have an average diameter that is not greater than 1 micrometer; and at least one layer formed from a polymer solution.

Another embodiment depicted in FIG. 1 includes an electrode 100 having a substrate 110, a conductive layer 120, and a multilayer structure 130. Generally, the multilayer structure 130 can be formed through layer by layer deposition. As used herein, a multilayer structure refers to a structure having two or more layers. Multilayer structures that are fabricated by such a method can also be referred to as composite thin films or multilayer films.

Embodiments include at least one substrate 110. A substrate 110 generally includes a first surface 102 and a second surface 104. Generally, the surface of the substrate 110 that does not have other components of the electrode 100 placed thereon is referred to as the first surface 102 of the substrate 110. Contrary to that, the second surface 104 of the substrate 110 is the surface that has another component of the electrode 100 placed thereon. The type of substrate that will be used will depend at least in part on the final application and purpose of the device that is being fabricated. In one embodiment, the substrate can be transparent. The substrate can be either rigid or flexible. Embodiments provide the advantage of utilizing low drying temperatures which allows plastic substrates to be utilized. Examples of substrates include but are not limited to glass, polyethylene terephthalates (PETs), polyimides, polyethylene naphthalates (PENs), polycarbonate, poly(ether etherketone) (PEEK), poly(ether sulfone) (PES), polyarylates (PAR), and polycyclic olefin (PCO). The substrate can also be a component of another device or the surface of another device or structure.

Embodiments also include a conductive layer 120. The conductive layer 120 is on the second surface 104 of the substrate 110. The conductive layer 120 allows the conduction of electricity from a source, which can be connected to the substrate 110, to the multilayer structure 130. The conductive layer 120 can include, but is not limited to, metal oxides such as indium tin oxide (ITO), tin oxide, fluorine doped tin oxide (FTO), zinc oxide, aluminum doped zinc oxide and antimony doped tin oxide (ATO). In other embodiments, vapor-deposited or electroless plated transparent metal films can be made using gold (Au), or silver (Ag); composites containing conductive nanowires; or thin carbon or metal grids can be utilized as the conductive layer 120. In one embodiment, the conductive layer 120 can be a part of the multilayer structure 130. In one embodiment, a highly conductive polymer film, such as a highly conductive PEDOT film, can be coated (by appropriate methods) onto a substrate to function as the conductive layer 120. One of skill in the art will also understand, having read this specification, that a commercially available metal oxide coated substrate can also be utilized as the substrate 110 and conductive layer 120 of this embodiment.

Electrodes also include a multilayer structure 130. The multilayer structure 130 includes at least one layer that includes an electroactive chemical bound nanoparticle and at least one layer that includes a polymer. One embodiment has a multilayer structure 130 that includes at least 5 layers of electroactive chemical bound nanoparticle and at least 5 layers of polymer. Another embodiment includes a multilayer structure that includes at least 10 layers of electroactive chemical bound nanoparticle and at least 10 layers of polymer. One embodiment has a multilayer structure 130 that includes at least 40 layers of electroactive chemical bound nanoparticle and at least 40 layers of polymer. The combination of individual layers of electroactive chemical bound nanoparticles and the polymer can be referred to as bilayers.

The multilayer structure 130 generally has a thickness of 3 micrometers (μm) to 15 μm. Another embodiment has a multilayer structure 130 that has a thickness of 4 μm to 12 μm. In one embodiment, each bilayer can have a thickness from 0.1 μm to 1.5 μm using different coating methods and solution concentrations. In another embodiment, each bilayer can have a thickness from 0.4 μm to 0.5 μm. The multilayer structure 130 can be formed as discussed above.

Another embodiment includes an article that includes a working electrode, and an electrolyte layer. In such an embodiment, the electrolyte layer is disposed on the working electrode. The working electrode in this embodiment can include the electrode as discussed, and exemplified in FIG. 1.

The electrolyte layer functions to facilitate the transfer of electrical charge from a ground potential or a current source to the electroactive chemical. Examples of electrolytes that can be used to form the electrolyte layer include, but are not limited to solvent based liquid electrolytes, polyelectrolytes, polymeric electrolytes, solid electrolytes, gel electrolytes, and UV curable electrolytes. Examples of specific electrolyte salts that can be utilized include, but are not limited to poly (vinyl imidazolium halide) and lithium iodide, poly(vinyl pyridinium salts), $LiN(CF_3SO_2)_2$ (commercially available as Fluorad HQ 115 from 3M, St. Paul, Minn.), $LiCF_3(SO_3)$ (lithiumtriflate)(commercially available from 3M, St. Paul, Minn.). During functioning of the device, at least some components of the electrolyte layer penetrate the multilayer structure 130 in order to convey ionic components to the electroactive chemical bound nanoparticle.

One embodiment includes a curable electrolyte, exemplary curable electrolyte compositions are disclosed in a U.S. patent application, filed on the same day as this application, entitled "CURABLE ELECTROLYTE", 3M docket number 62352US002, the disclosure of which is incorporated herein by reference.

Figure 2:
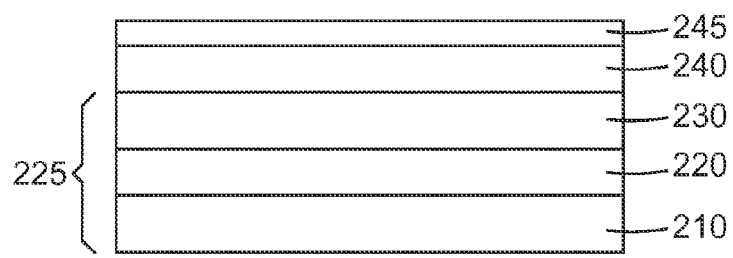
FIG. 2 depicts an exemplary electrochromic device in accordance with an embodiment.

One embodiment depicted in FIG. 2 also includes a release liner 245 positioned on the electrolyte layer 240. The release liner 245 can be formed of any useful material such as, for example, polymers or paper and may include a release coat. Suitable materials for use in release coats include, but are not limited to, fluoropolymers, acrylics and silicones designed to facilitate the release of the release liner 245 from the electrolyte layer 240. Such an embodiment could be useful if the electrode/electrolyte assembly was manufactured and sold separately from the remaining components of an electrochromic device.

Figure 3:
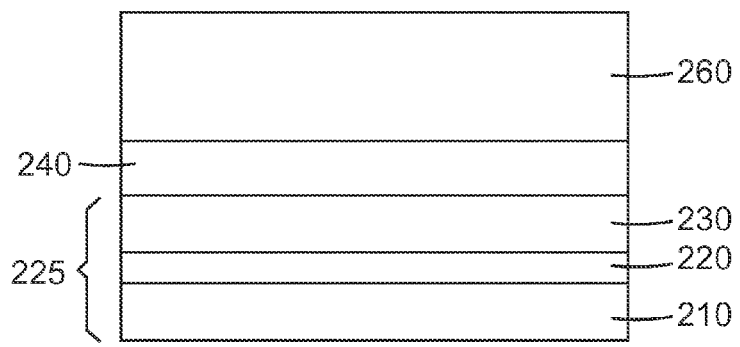
FIG. 3 depicts an exemplary electrochromic device in accordance with an embodiment.

Yet another embodiment, an example of which is depicted in FIG. 3 includes a working electrode 225 that includes a first substrate 210, a first conductive layer 220, and a multilayer structure 230; an electrolyte layer 240; and a counter electrode 260. The working electrode 225, and the electrolyte layer 240 are generally as described above.

The counter electrode 260 can be fabricated by any method known to those of skill in the art. Generally, the counter electrode is a layer, or layers, that provides the charges which enable the redox counterpart to the process occurring at the working electrode. Generally, the layer or layers of the counter electrode are formed on a substrate. The characteristics of the substrate, as well as exemplary types of substrates can generally be the same as those described above with respect to the working electrode. Some embodiments can also include counter electrodes that include antimony doped zinc oxide (AZO) nanoparticles.

In an embodiment wherein the counter electrode contains AZO, the AZO can be combined with at least one organic binder and at least one solvent to form a counter electrode coating composition. In one embodiment the counter electrode coating composition can include from 20 wt-% to 35 wt-% AZO. In another embodiment, the counter electrode coating composition can include from 20 wt-% to 25 wt-% AZO. In yet another embodiment, the counter electrode coating composition can include about 24 wt-% AZO.

The counter electrode coating composition also includes at least one organic binder. Organic binder materials are materials that can function as a viscosity modifier, have film forming properties, can add mechanical strength to films that are formed therewith, or some combination thereof. Generally, the at least one organic binder has a minimal solubility in polar solvents and/or high boiling point solvents. Generally, the at least one organic binder material is compatible with other solvents in the counter electrode coating composition. Also, the at least one organic binder is compatible with the other components of the counter electrode coating composition so that a homogenous solution is created and maintained when the counter electrode coating composition is formed. It is also generally desirable that the organic binder not be soluble in other materials that it may come in contact with. A specific example of this includes the organic binder material being insoluble in the electrolyte with which the counter electrode may be in contact.

In one embodiment, organic binder materials that are utilized include high molecular weight polymers. Exemplary materials include, but are not limited to polyethylene oxide (PEO), polyvinyl alcohol (PVA), or polyacrylic acid (PAA). In one embodiment, the organic binder is an alkyl cellulose ether. Examples of alkyl cellulose ethers include, but are not limited to methyl cellulose, hydroxypropyl methyl cellulose and derivatives of hydroxyethyl cellulose. In one embodiment, a methyl cellulose ether is utilized. Suitable methyl cellulose ethers are commercially available from Dow Chemical (Midland Mich.). Specific examples of methyl cellulose ethers that can be utilized include METHOCEL E4M from Dow Chemical.

In one embodiment, the counter electrode coating composition contains from 0.5 wt-% to 1.5 wt-% of the at least one organic binder. In another embodiment, the counter electrode coating composition contains from 0.75 wt-% to 1.25 wt-% of the at least one organic binder. In yet another embodiment, the counter electrode coating composition contains about 1 wt-% of the at least one organic binder.

The counter electrode coating composition also includes at least one solvent. The at least one solvent generally functions to mix the organic binder with the other materials in the counter electrode coating composition. It can also function to allow the counter electrode coating composition to be coated onto a substrate. In one embodiment therefore, any solvent that can accomplish this function can therefore be included in a counter electrode coating composition. In another embodiment, there is at least one solvent in the counter electrode coating composition that can function to control the rate at which the counter electrode coating composition dries once it is applied to a surface. In such an embodiment it can be beneficial to include at least one solvent that has a high boiling point. In one embodiment there is at least one solvent in the counter electrode coating composition that is a polar solvent. In one embodiment, there is at least one solvent in the counter electrode coating composition that is compatible with the other components of the counter electrode coating composition.

In one embodiment, the counter electrode coating composition includes water, at least one alcohol, and at least one glycol ether as solvents. In yet another embodiment, the counter electrode coating composition includes water, methanol, and diethylene glycol monoethyl ether as solvents. In even a further embodiment, the counter electrode coating composition includes water, methanol, and DOWANOL™ tripropylene glycol methyl ether (TPM) (Dow Chemical Company, Midland Mich.) as solvents. In one embodiment, a counter electrode coating composition includes from 55 wt-% to 90 wt-% of solvent (one or more than one solvent). In another embodiment, the counter electrode coating composition contains from 65 wt-% to 80 wt-% of solvent (one or more than one solvent). In one embodiment, the counter electrode composition contains from 10 wt-% to 20 wt-% of alcohol, from 3 wt-% to 15 wt-% of water, and from 40 wt-% to 60 wt-% of glycol ether.

The counter electrode coating composition as discussed above can be used to form the counter electrode using any method known to those of skill in the art, having read this specification. Generally, coating methods that can produce substantially uniform coatings are utilized. Examples of such methods include, but are not limited to, knife coating, screen printing, extrusion coating, gravure coating, reverse gravure coating, spin coater, dip coater, knife coater, roll coater, slide coater, slot coater, curtain coater and inkjet coating. In one embodiment, screen printing is utilized. Screen printing, gravure coating, and reverse gravure coating can all be advantageous because they can afford the ability to deposit the coating composition in a specific pattern on the substrate.

The desired viscosity of the counter electrode coating composition depends at least in part on the particular coating method that will be used. Where screen printing is utilized, the desired viscosity values are the same as those that were discussed with respect to the working electrode above. The porosity of the counter electrode that is formed also generally is controlled so that facile ionic transport ($Li^+$ ions for example) occurs. In some embodiments, the porosity of the counter electrode can be similar to that discussed above with respect to the working electrode.

Figure 4:
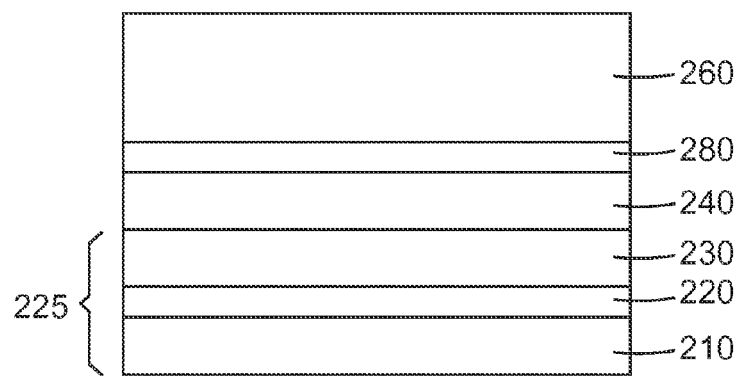
FIG. 4 depicts an exemplary electrochromic device in accordance with an embodiment.
Figure 5A:
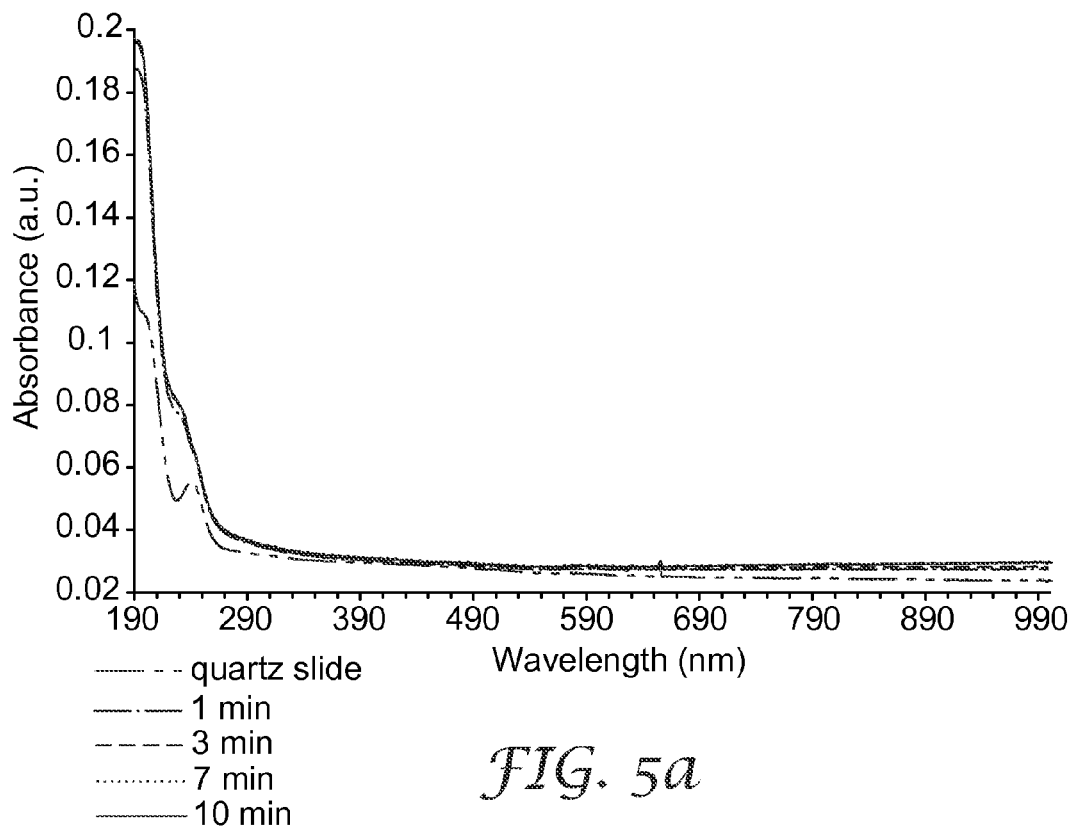
FIG. 5 shows (a) UV-VIS spectra of fused silica slide after different deposition times in PEDOT solution (example 2); (b) UV-VIS difference spectra of fused silica slide after different deposition times in PEDOT solution. The spectrum of untreated fused silica slide is subtracted (example 2); (c) UV-VIS spectra of PEDOT coated fused silica slide after different deposition times in $TiO_2$ solution (example 2); and (d) UV-VIS difference spectra of PEDOT coated fused silica slide after different deposition times in $TiO_2$ solution. The spectrum of PEDOT coated fused silica slide is subtracted (example 2).
Figure 5B:
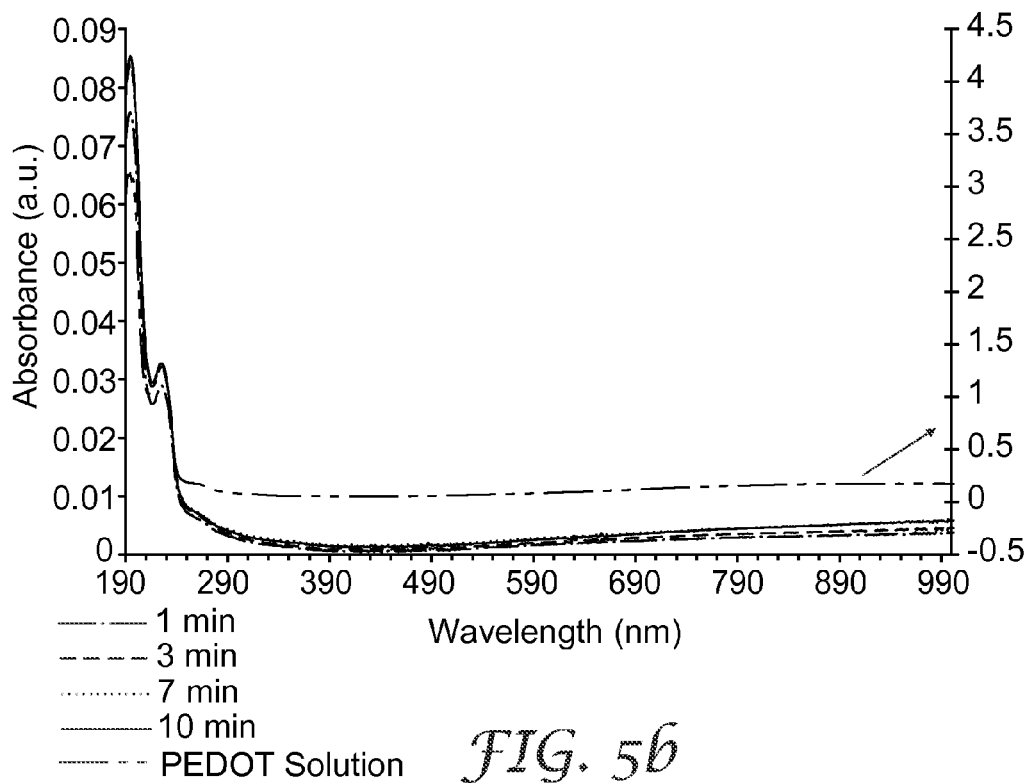
Figure 5C:
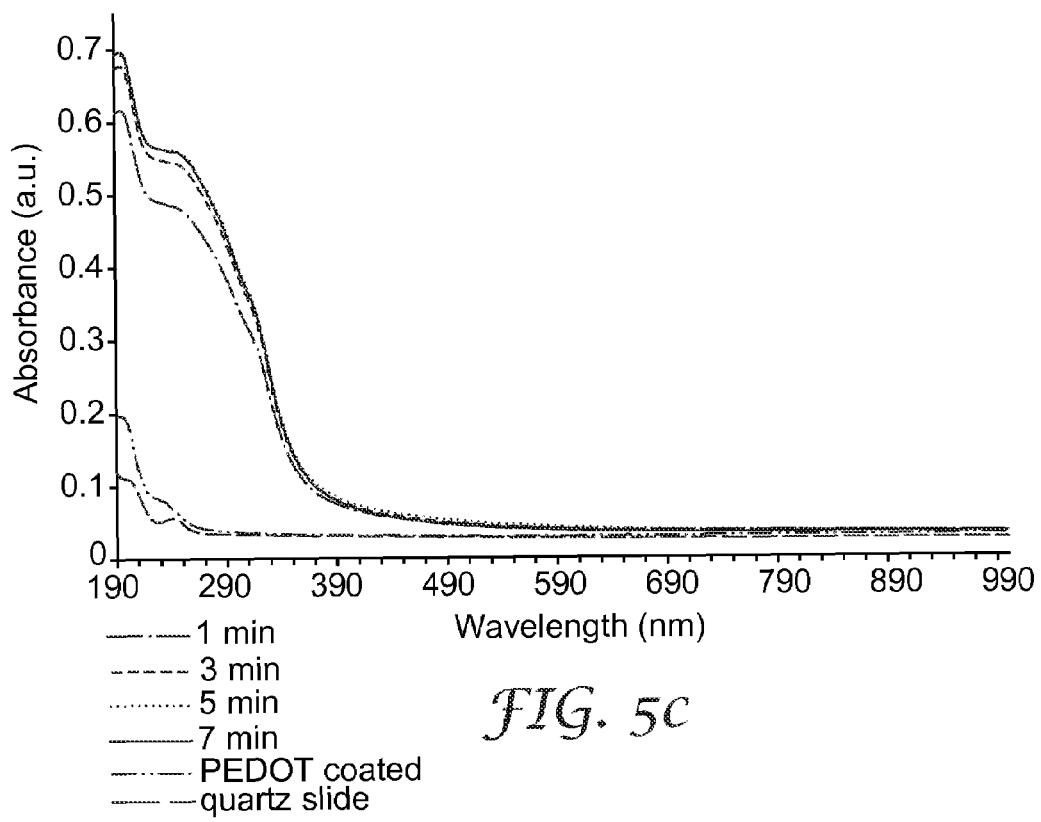
Figure 5D:
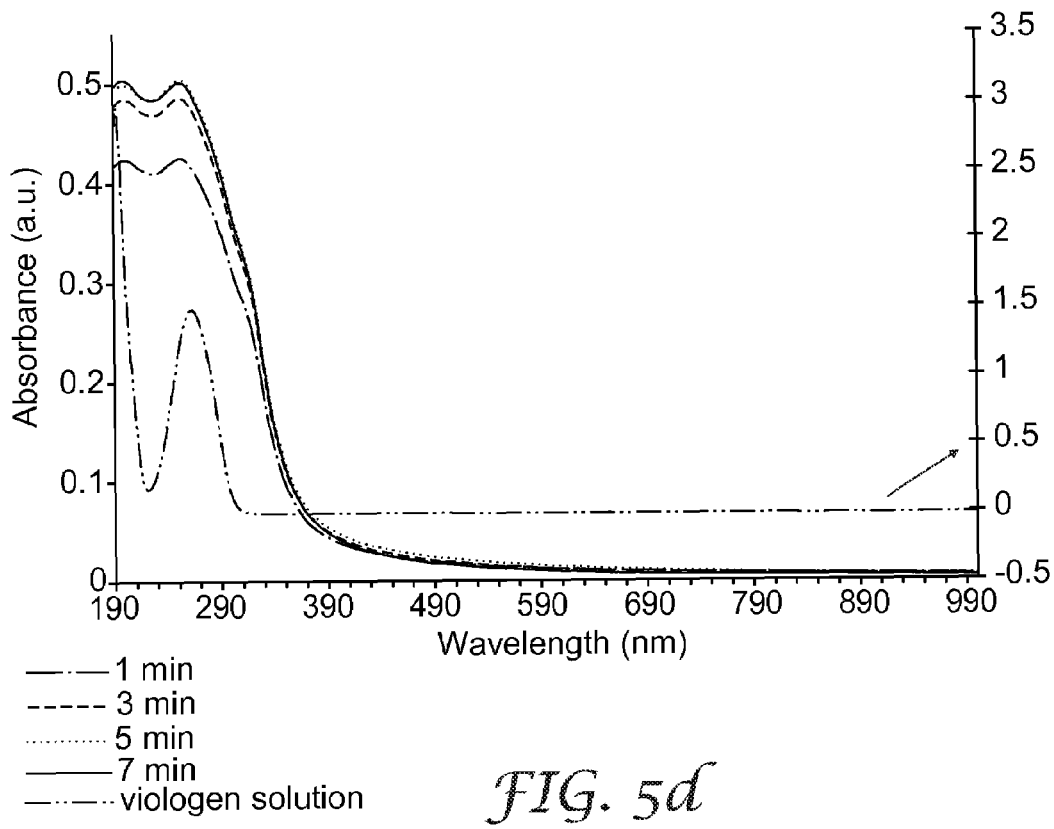

Another embodiment, of an electrochromic device 300 is depicted in FIG. 4, and includes the components discussed above with respect to FIG. 3 and also includes a reflective layer 280. The reflective layer 280 is generally positioned between the working electrode 225 and the counter electrode 260. More specifically, the reflective layer 280 can be positioned on top of the working electrode 225, on top of the counter electrode 260, or on top of both electrodes. The electrolyte layer 240 and the reflective layer 280 overlap somewhat in that the components of the electrolyte layer 240 will migrate into the reflective layer 280. The reflective layer 280 therefore cannot disrupt the ionic transport through the space where it exists. The reflective layer 280 functions to separate the two electrodes, allow the passage of ionic electrolyte and maintain a white background for a reflective display device.

In one embodiment, the reflective layer includes material that is insulating and scatters light. In one embodiment, the reflective layer includes a layer of alumina coated $TiO_2$. In one embodiment, the reflective layer is from 10 µm to 200 µm thick. In yet another embodiment, the reflective layer 280 is from 25 µm to 100 µm thick.

In another embodiment, the reflective layer 280 includes a reflective porous membrane. A reflective porous membrane can generally function to block out the color of the underlying counter electrode. This is often desirable because the counter electrode can be metallic (e.g. gold) or a highly doped and dark colored metal oxide (e.g. antimony doped tin oxide (ATO) and antimony doped zinc oxide (AZO)). The reflective porous membrane can function to mask the counter electrode and in some embodiments provide a white background. A layer of alumina coated $TiO_2$ as discussed above can also be utilized to fulfill this function, but can be inflexible, which can lead to shorting and a short lived device.

The reflective porous membrane can also function as a separator between the working electrode 225 and the counter electrode 260. Often, additional gaskets, spacer beads, or membranes are utilized to maintain the gap between the working electrode and the counter electrode. Such structures contribute to durability and flexibility concerns and can require more time consuming manufacturing. A reflective porous membrane can eliminate the need for those additional structures by maintaining the gap between the counter electrode and the working electrode.

A reflective porous membrane can also enhance the mechanical stability of the overall device by providing a mechanically stable layer in place of a gap that is filled with electrolyte.

A reflective porous membrane is generally reflective of light in the visible range. The large variations in the refractive indices of the voids, polymer, and particles within the reflective porous membrane ensure high reflectivity of the membrane even when the membrane is soaked with electrolyte whose index of refraction is close to the polymer. As used herein with respect to the reflective porous membrane, reflective generally means that the membrane has at least 90% reflectance of light from 425 nm to 800 nm in air. In another embodiment, reflective generally means that the membrane has at least 95% reflectance of light from 425 nm to 800 nm in air.

A reflective porous membrane is generally porous. As used herein with respect to the reflective porous membrane, porous generally means that ionic components can be conducted across the reflective porous membrane. In one embodiment, porous, as used with respect to the reflective porous membrane generally means that the mean pore diameter is at least 0.01 µm. In another embodiment, porous means that the mean pore diameter is at least 0.1 µm. In yet another embodiment, porous means that the mean pore diameter is at least 0.2 µm. The porous nature of the reflective porous membrane also allows the reflective porous membrane to absorb liquid electrolyte to minimize leakage of the electrolyte and prevent or minimize contamination from the sealants.

The reflective porous membrane is also generally conformable and flexible. Reflective porous membranes that are conformable and/or flexible may offer an advantage in electrochromic devices that are flexible. In flexible devices having a conformable, flexible reflective porous membrane, bending may not cause a short circuit in the device because the reflective porous membrane will bend with the device, maintaining the gap.

Generally, reflective porous membranes have a thickness from 20 µm to 100 µm. In another embodiment, reflective porous membranes have a thickness from 25 µm to 45 µm. In yet another embodiment, reflective porous membranes have a thickness from 30 µm to 35 µm. In even a further embodiment, a reflective porous membrane has thickness of about 30 µm.

A reflective porous membrane is formed using a solvent induced phase separation (SIPS) process. Generally, SIPS processes are known to those of skill in the art, an exemplary SIPS process and its application can be found in U.S. Pat. No. 6,692,799, the disclosure of which is incorporated herein by reference. Generally, SIPS processes that are used to form the reflective porous membranes utilize a membrane solution that contains a polymer solution, a pore forming solution, and reflective particles. The membrane solution is coated on the substrate, and then the coating is dried by evaporation of solvents. In one embodiment, the membrane solution is dried at temperatures that are amenable to being used with flexible, plastic substrates. As the membrane solution is dried, the solvent in which the polymer is soluble is chosen so that it evaporates before the pore forming solution, causing the polymer to solidify and phase separate from the pore forming solvents, forming the polymer portion of the reflective porous membrane. When the pore forming solution evaporates the pores in the reflective porous membrane are formed because the polymer has already solidified.

The pore size, and pore fraction generally contribute to the ionic mobility through the reflective porous membrane. The ionic mobility and reflectance of the reflective porous membrane can be determined based on the particular solvents used, the amounts of solvents used, the drying time and temperature, and the amount and size of the reflective particles. The way in which the pore size, pore fraction, and reflectance can be modified by changing these (and other) parameters would be within the ordinary level of one of skill in the art, having read this specification.

For example, as the ratio of the pore forming solution to the polymer solution is increased, the pores in the reflective porous membrane should increase in size, and vice versa. Also, as the amount of the reflective particles is increased, the reflectance of the microporous membrane will be increased. One of skill in the art, having read this specification, will also understand that the amounts and identities of the components are bound somewhat by the necessary mechanical properties of the final reflective porous membrane.

As stated above, the SIPS process utilizes a polymer solution. The polymer solution can include one or more than one polymer. In one embodiment at least two polymers are utilized in the polymer solution. The particular polymer(s) that is utilized is generally chosen based at least in part on the mechanical properties and flexibility that are desired in the ultimate reflective porous membrane. In one embodiment, at least one fluorinated thermoplastic polymer is utilized. In one embodiment, a polyvinylidene polymer is utilized. In one embodiment, a copolymer including a polyvinylidene polymer is utilized. In yet another embodiment, a copolymer, polyvinylidene fluoride-co-hexafluoropropylene (PVDF-HFP) is utilized in the polymer solution. Commercially available polyvinylidene fluorides, KYNAR® polyvinylidene fluorides from Arkema, Inc. (Philadelphia, Pa.) may be utilized. In one embodiment, more than one specific Kynar® polyvinylidene fluoride polymer may be utilized.

The polymer solution also includes at least one polymer solvent. The at least one polymer solvent is generally one in which the polymer is soluble. In an embodiment where polyvinylidene fluoride polymers are utilized, acetone or other ketones can be utilized as the polymer solvent. In some embodiments, tetrahydrofuran (THF) or dimethyl carbonate can be utilized as a polymer solvent. Generally, the at least one solvent has a higher vapor pressure than the solvents in the pore forming solution at room temperature and has a low boiling point.

Generally, the polymer solution has from 5 wt-% to 30 wt-% polymer. In another embodiment, the polymer solution has from 5 wt-% to 20 wt-% polymer. In yet another embodiment, there is 10 wt-% of polymer in a polymer solution. One of skill in the art, having read this specification, will understand how both increasing and decreasing the amount of polymer in the polymer solution will affect reflective porous membranes that are formed using such solution.

One of skill in the art, having read this specification, will understand that additional components, not specifically mentioned herein can also be added to the membrane solution in order to obtain desired properties in the reflective porous membrane. Examples of such other components include, but are not limited to the following. In one embodiment, crosslinkable functionalized polyethylene glycol (PEG) oligomers such as polyethylene glycol diacrylate (PEGDA) can optionally be added to a membrane solution. When the pore forming solvents used are more hydrophilic than the polymer solvents PEGDA will reside in the more hydrophilic pore forming solvents. This can help to adjust the porosity of the membrane and once the solution is crosslinked, it will improve the mechanical strength of the membrane. In another embodiment, inorganic additives such as fumed silica (Aerosil200 from Degussa for example) can also be added in the membrane solution to adjust the viscosity of the membrane coating solution and improve the mechanical strength of the membrane and its adhesion to the substrate.

Membrane compositions also include a pore forming solution. The pore forming solution includes at least one solvent in which the polymer is insoluble, referred to herein as a pore forming solvent. As the pore forming solvent evaporates, the space in which it existed in the coating, forms voids in the microporous membrane. The pore forming solvent generally evaporates after the polymer solvent. The pore forming solvent therefore has a lower vapor pressure than the polymer solvent at the same temperature. In one embodiment where the polymer solvent is a ketone, the pore forming solvent is an alcohol, water, or some combination thereof. In one embodiment, the pore forming solvent is a mixture of water and ethanol.

The membrane solution also includes at least one kind of reflective particles. Generally, reflective particles include reflective metal oxides, including, but not limited to titanium dioxide ($TiO_2$), zirconium dioxide ($ZrO_2$), zinc sulfide (ZnS), and alumina ($Al_2O_3$). Some embodiments utilize reflective particles that are white in color. Particular exemplary titanium dioxide particles that can be utilized include, but are not limited to, CR-50-2 commercially available from Ishihara Corporation (USA)(San Francisco, Calif.).

In one embodiment, a membrane composition contains from 60 wt-% to 85 wt-% of the polymer solution. In another embodiment, a membrane composition contains from 70 wt-% to 80 wt-% polymer solution. In yet another embodiment, a membrane composition contains from 74 wt-% to 76 wt-% polymer solution.

In one embodiment, a membrane composition contains from 5 wt-% to 20 wt-% reflective particles. In another embodiment, a membrane composition contains from 5 wt-% to 15 wt-% reflective particles. In yet another embodiment, a membrane composition contains about 10 wt-% reflective particles.

In one embodiment, a membrane composition contains from 5 wt-% to 20 wt-% pore forming solution. In another embodiment, a membrane composition contains from 5 wt-% to 15 wt-% pore forming solution. In yet another embodiment, a membrane composition contains from 10 wt-% to 15 wt-% pore forming solution.

In one embodiment, the SIPS process includes forming the polymer solution, forming the pore forming solution, mixing the polymer solution and pore forming solution together, adding the reflective particles to the polymer/pore forming solution to form the membrane solution, coating an electrode with the membrane composition, and drying the membrane composition to form the reflective porous membrane.

Generally, the mixing of the various solutions can be done using methods known to those of skill in the art. The membrane composition can be coated onto the substrate using methods known to those of skill in the art. Such methods include, but are not limited to, use of a notch bar coater, die coater, gravure coater, reverse gravure coater, or an ink jet. In embodiments where a notch bar coater is utilized, notch widths of from 10 mils to 30 mils can be utilized. In other embodiments, notch widths of from 15 mils to 25 mils can be used. In another embodiment, a notch width of 20 mils can be used.

Generally, the drying of the coated electrode can also be carried out using methods known to those of skill in the art. In one embodiment, the coated electrode substrates are dried in air first to evaporate most of the polymer solvent. Then, they can be further dried at elevated temperatures for example, in a convection oven at 80 to 100° C. for 5 to 10 minutes, to remove any residual polymer and pore forming solvents.

Further experimental details surrounding the reflective porous membrane are disclosed in a U.S. patent application, filed on the same day as this application, entitled "ELECTROCHROMIC DEVICE", 3M docket number 62353US002, the disclosure of which is incorporated herein by reference.

EXPERIMENTAL

Materials

P25 $TiO_2$ powder was obtained from Degussa (Dusseldorf, Germany).

Modified viologen (1,1'-bis(2-phosphonoethyl)-4,4'-bipyridinium dichloride), was synthesized by adding 4,4'-bipyridine (4.4 g) and diethyl-2-bromoethyl phosphonate (15.0 g) to water (75 mL), and refluxing the reaction mixture for 72 hours. After the reaction mixture was allowed to cool, concentrated hydrochloric acid (50%, 75 mL) was added and the mixture was refluxed for another 24 hours. The product was recovered by concentrating the reaction mixture to 50 mL, adding 200 mL 2-propanol dropwise, and stirring the mixture, on ice, for an hour, followed by filtering. The white crystalline product was washed with cold 2-propanol and air dried to give the redox chromophore 1,1'-bis(2-phosphonoethyl)-4,4'-bipyridinium dichloride.

Indium tin oxide (ITO) coated substrates were obtained from Sheldahl (Northfield, Minn.).

Aminopropyl triethoxysilane (APS) was obtained from Sigma-Aldrich (St. Louis, Mo.).

PEDOT/PSS solution, Baytron®-PHC V4, was obtained from H.C. Stark (Newton, Mass.).

Celnax CX-Z641M (Dispersion of 60 wt % antimony doped zinc oxide 20 nm particles in Methanol) was obtained from Nissan Chemical America Corporation (Houston, Tex.).

METHOCEL E 4M was obtained from Dow Chemical (Midland Mich.).

Diethylene glycol monoethylether was obtained from Alfa Aesar (Ward Hill, Mass.).

The AZO paste was prepared by adding the desired amount of the METHOCEL 4M solution (10% Methylcellulose 4M in DI water) and diethylene glycol monoethyl ether solvent into a glass vial/jar containing a magnetic stir bar. The METHOCEL binder and solvent generally require a minimum of 8 hours stirring at 90-100° C., the contents were therefore stirred overnight (14-18 hours). Next the Celnax CX-Z641M (Dispersion of 60 wt % antimony doped zinc oxide 20 nm particles in Methanol) was added to the mixture. The solution was stirred an additional 7 hours at 90° C. The paste was allowed to cool before screen printing.

Alumina coated $TiO_2$ particles (CR-50-2 from ISK, ~300 nm) was obtained from Ishihara Corporation USA (San Francisco, Calif.).

EXAMPLE 1

Deposition of a Multilayer Film

A dispersion was prepared by premixing titanium dioxide nanopowder, P25 from Degussa using a T 25 ULTRA-TURRAX® Rotor-Stator high-shear mixer (IKA® Works, Inc., Wilmington, N.C.) with an aqueous solution of modified viologen (prepared as given above) at 0.8 mM, or 10 mM. The weight percent of $TiO_2$ in the dispersion was about 5% wt. The mixture was further dispersed by the use of a microfluidizer® with serial 250 μm and 85 μm interaction chambers (Microfluidics, Newton, Mass.) operated at about 30,000 psi for up to 8 passes.

A multilayer film was fabricated by first (1) treating an indium tin oxide (ITO) coated substrate (both glass and plastic—also referred to herein as slide) with aminopropyl triethoxysilane (APS) to provide a positively charged surface. (2) The slide was dipped in 2 mM PEDOT/PSS solution (diluted from Baytron®-PHC V4 with pH=4 DI water) for 5 minutes. (3) The slide was then sequentially dipped in two beakers of agitated DI water for 1 min. (4) The slide was then allowed to air dry for 5 minutes. (5) The dried slide was then dipped in 5% wt $TiO_2$ colloid dispersion (diluted from more concentrated stock solution (as prepared above) with pH=4 DI water or viologen solutions with appropriate concentrations) for 5 minutes. The viologen concentration in the dispersion after dilution was about 0.8 mM to 20 mM and the % wt of $TiO_2$ was 5%. (6) The slide was then sequentially dipped in two beakers of agitated DI water for 1 minute each for rinsing. (7) The slide was then allowed to air dry for 5 minutes. Steps 3 to 7 were then repeated to coat the desired number of bilayers.

UV-VIS (ultraviolet/visible) spectroscopy was used to monitor the deposition of the multilayers of PEDOT/PSS and TiO2 nanoparticles as in FIG. 5.

Figure 6A:
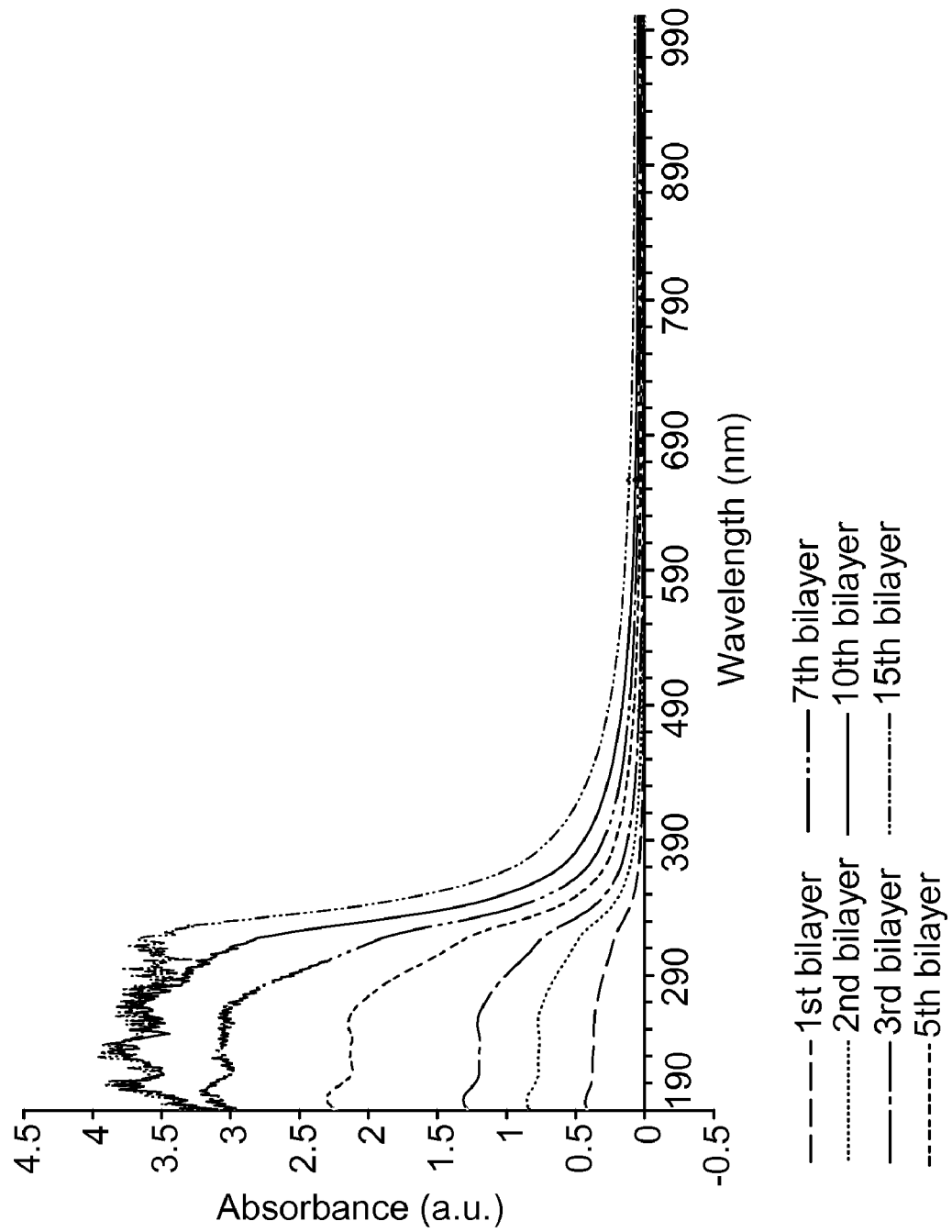
FIG. 6 (a) shows the UV-VIS difference spectra of multilayer films having different numbers of PEDOT/$TiO_2$ bilayers; (b) shows the absorbance at 257 nm for different numbers of bilayers; and (c) shows the absorbance at 200 nm for different number of bilayers.
Figure 6B:
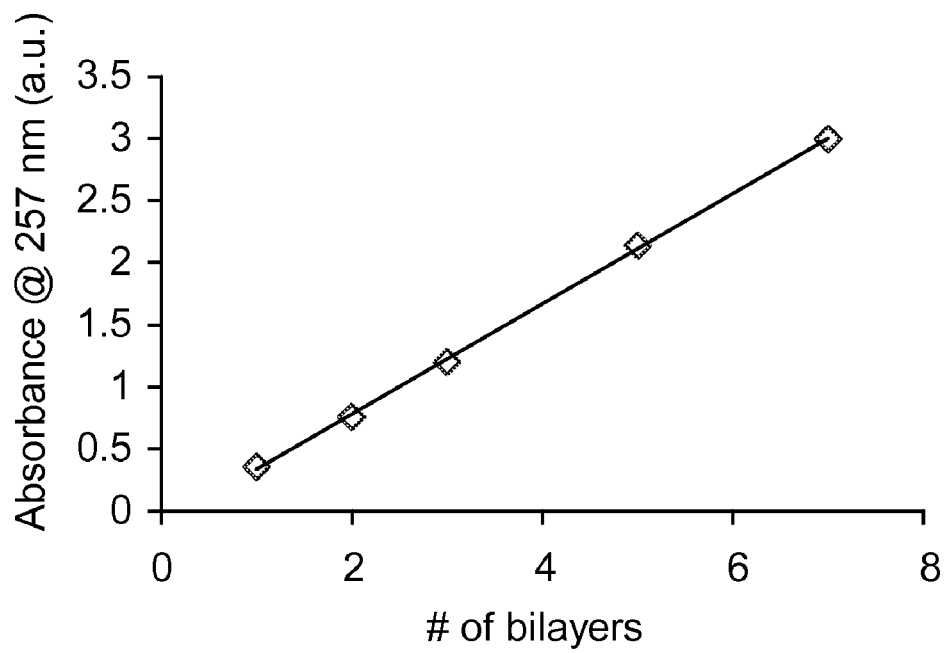
Figure 6C:
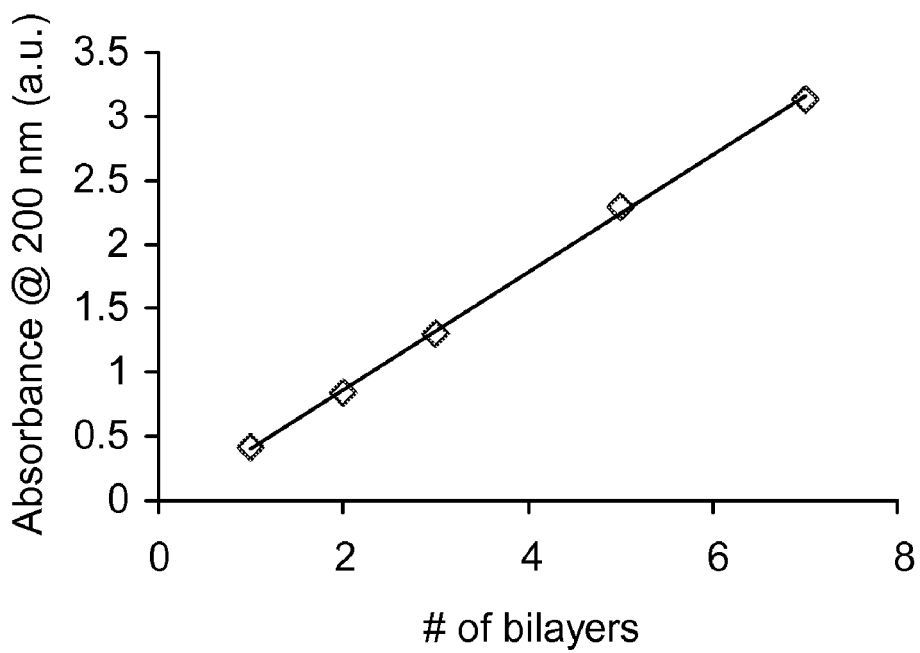

To determine if the formation of PEDOT/PSS and TiO2/viologen bilayers is a well controlled process, absorption at 200 nm and 257 nm was monitored with respect to the number of bilayers formed. The same coating solutions and process as was used in the generation of FIG. 5 was utilized to form the multilayered films that were monitored via UV-VIS spectroscopy. FIGS. 6a, 6b, and 6c show the absorption as a function of wavelength for an increasing amount of bilayers. A spectrum of a fused silica slide was used as the background. For the 10th and 15th bilayers the UV absorbance in the short wavelength range was out of the dynamic range of the instrument.

Figure 7A:
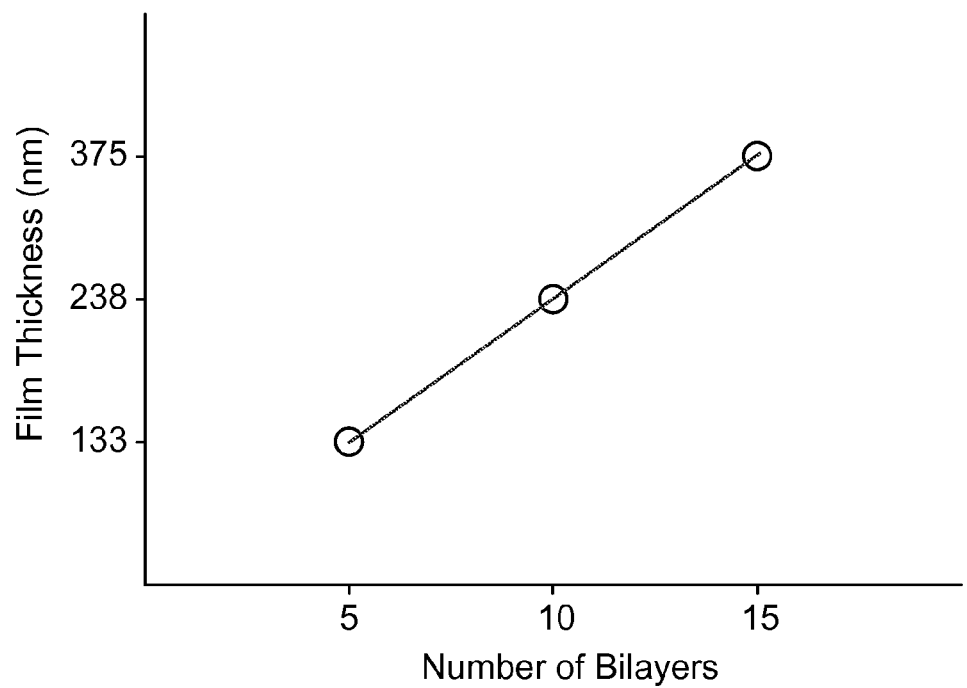
FIG. 7 shows the film thickness of multilayer films having different numbers of PEDOT/$TiO_2$ bilayers; with the film tested in FIG. 7a being formed from a $TiO_2$ coating solution having a viologen concentration of 0.8 mM.
FIG. 7b being formed form a $TiO_2$ coating solution having a viologen concentration of about 10 mM.
Figure 7B:
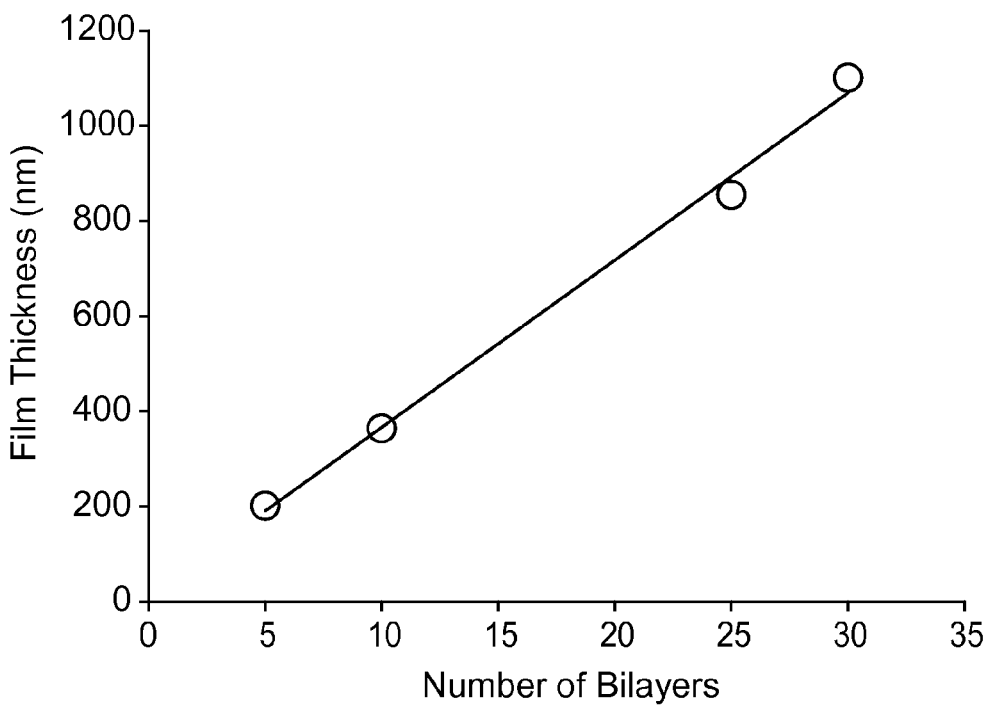

The film thickness of the film made above was measured using a KLA-Tencor P115 (KLA-Tencor, San Jose, Calif.) profiler. A linear relationship was found between the film thickness and the number of layers. Monotonically, the film thickness increased with the number of deposited bilayers. By changing the coating solution conditions, the film thickness change rate can be changed. For example, in FIG. 7(b), the viologen concentration in the TiO$_2$ dispersion was 10 mM and the deposition film thickness changed at about 35 nm/bilayer compared to about 25 nm/bilayer when the viologen concentration was 0.8 mM in FIG. 7(a).

Figure 8A:
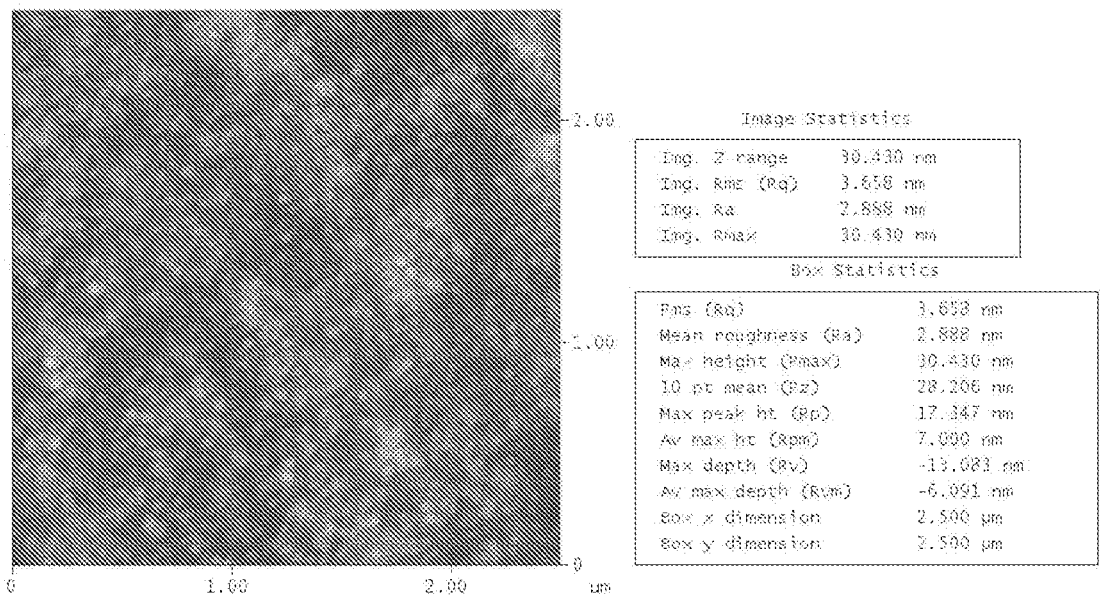
FIG. 8 show atomic force microscopy (AFM) images of the first PEDOT/PSS layer at 2.5×2.5 μm (FIG. 8a) and 1×1 μm (FIG. 8b); the $TiO_2$/viologen layer of the $10^{th}$ bilayers at 2.5×2.5 μm (FIG. 8c); and the PEDOT/PSS layer of the $11^{th}$ bilayer at 2.5×2.5 μm (FIG. 8d).
Figure 8B:
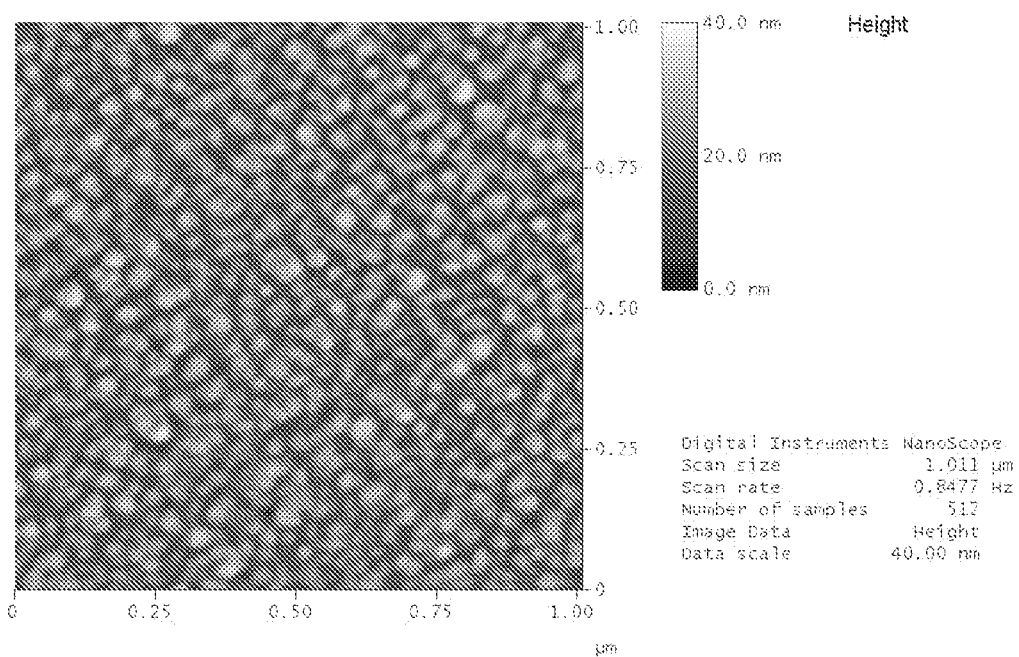
Figure 8C:
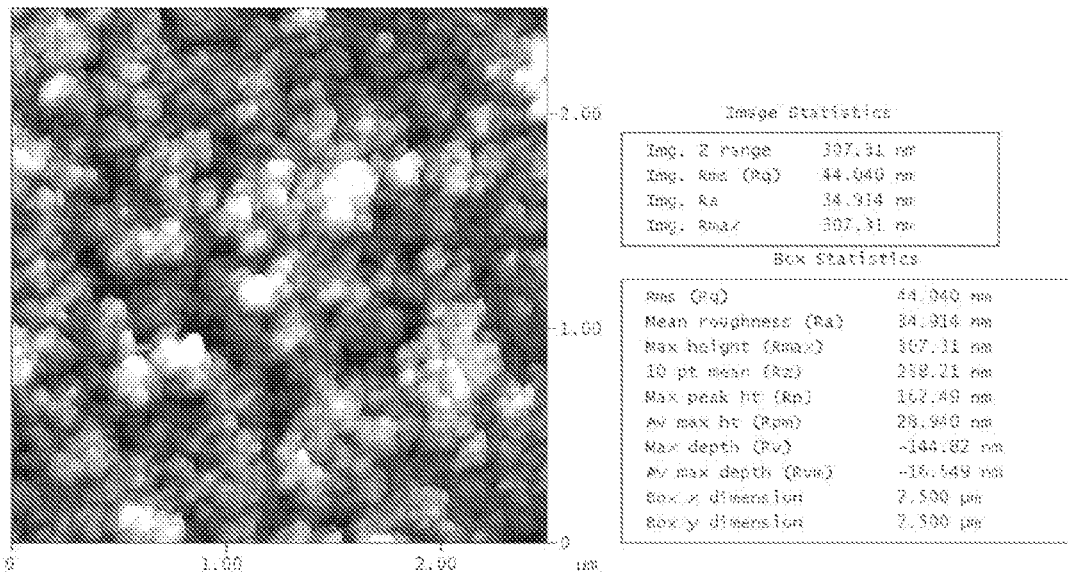
Figure 8D:
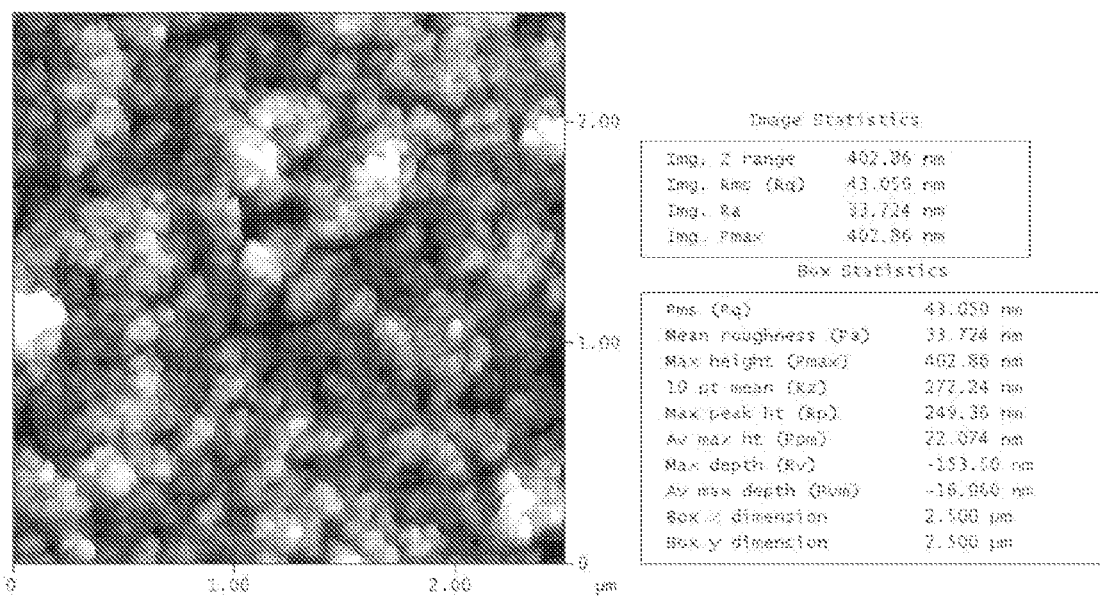

Atomic force microscopy (AFM) images were obtained (on a Digital Instruments Dimension 5000 SPM) of the first PEDOT/PSS layer at 2.5×2.5 µm (FIG. 8a) and 1×1 µm (FIG. 8b); the TiO$_2$/viologen layer of the 10$^{th}$ bilayers at 2.5×2.5 µm (FIG. 8c); and the PEDOT/PSS layer of the 11$^{th}$ bilayer at 2.5×2.5 µm (FIG. 8d). The AFM images show that the deposition of viologen coated TiO$_2$ particles forms very porous layers and the PEDOT/PSS layer conformably caps the TiO$_2$ layer without increasing surface roughness.

EXAMPLE 2

Formation of Remainder of Electrochromic Device

An electrochromic device was then prepared. The counter electrode (C.E.) was formed by screen printing an AZO paste (prepared as above). The film was about 7 µm after drying at 80° C. On top of the AZO film a white reflector layer of alumina coated TiO$_2$ particles (CR-50-2 from ISK, ~300 nm) was deposited by screen printing. A UV curing sealant was dispersed along the edge of the electrode leaving two open filling holes. The UV sealant was formulated in accordance with U.S. patent application Ser. No. 11/423,191, entitled "BONDING METHOD WITH FLOWABLE ADHESIVE COMPOSITION", filed on Jun. 9, 2006, the disclosure of which is incorporated herein by reference. Glass beads of 75 µm were used as the spacer beads between the working and counter electrodes. A UV curable electrolyte, which is described in detail in a U.S. patent application, filed on the same day as this application, entitled "CURABLE ELECTROLYTE", 3M docket number 62352US002 was subsequently backfilled into the assembled device by capillary force. The filling holes were then finally sealed with the 3M UV curable sealant described above.

EXAMPLE 3

Performance of Flexible Electrochromic Devices

Figure 9:
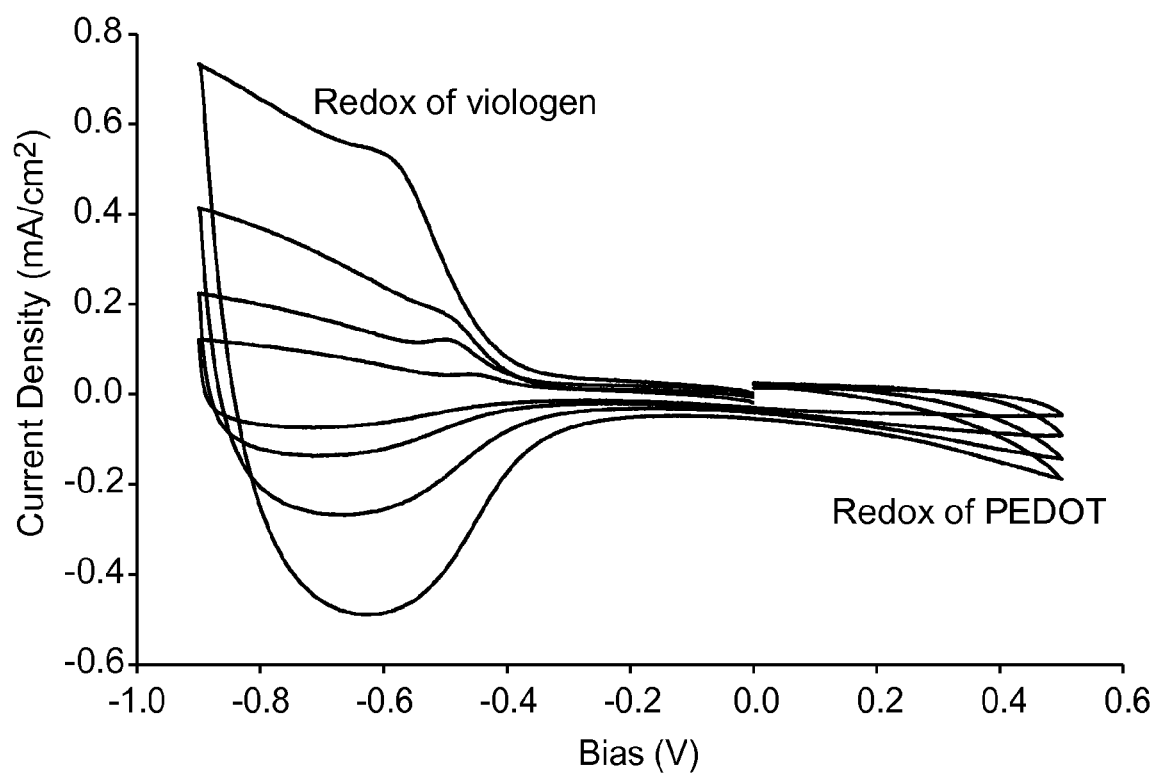
FIG. 9 shows cyclic voltammograms of the electrochromic device formed in Example 3. In the direction of increasing current density the scanning rates are: 25 mV/sec, 50 mV/sec, 100 mV/sec and 200 mV/sec. The voltage scans from 0.0V to −0.9V to 0.5V and then back to 0.0V.

The multilayer PEDOT/TiO$_2$ structure was used as the positive (working) electrode and the AZO nanoparticle thin film was used as the negative (counter) electrode. A cyclic voltammogram was recorded in the direction of increasing current density with sweeping rates of: 25 mV/sec, 50 mV/sec, 100 mV/sec and 200 mV/sec. The results are shown in FIG. 9.

Figure 10A:
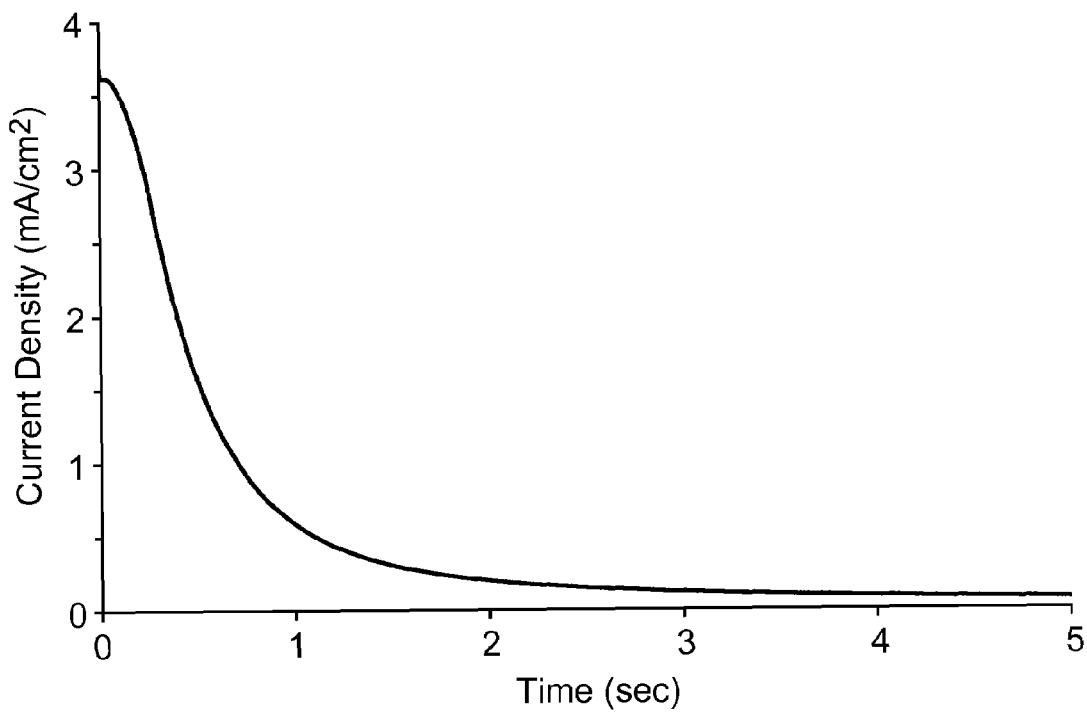
FIG. 10 shows chronoamperometric plots of the electrochromic device formed in Example 3, with FIG. 10a showing the reduction (switching from 0.7 V to −0.9 V) and FIG. 10b showing the oxidation (switching from −0.9 V to 0.7 V).
Figure 10B:
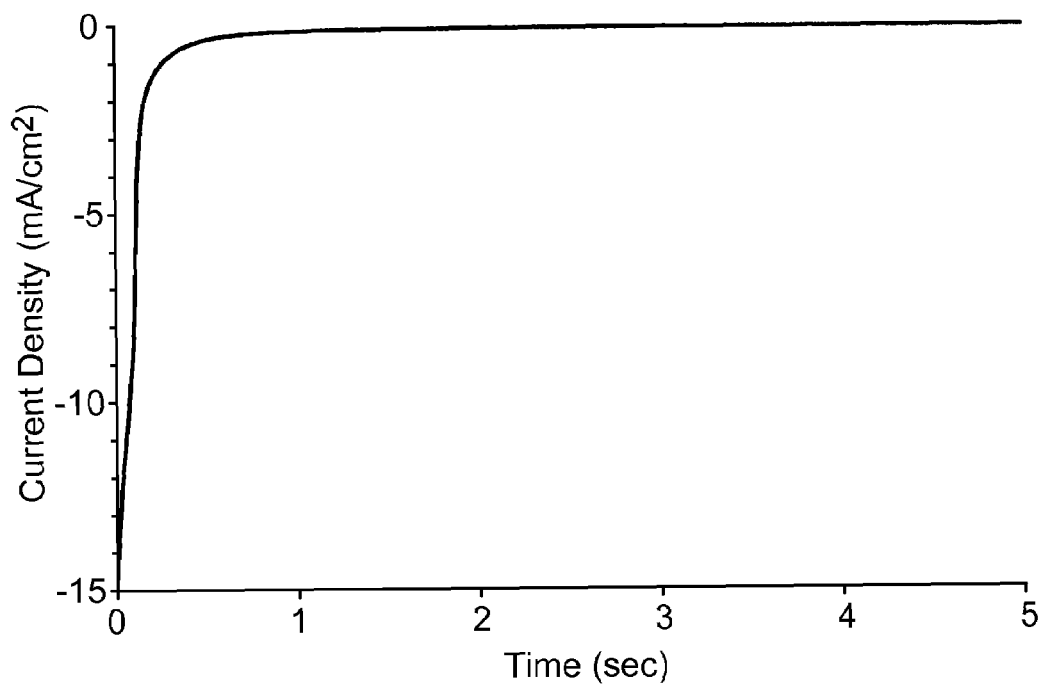

Chronoamperometric plots of the electrochromic device were also recorded. FIG. 10a shows the reduction of the PEDOT/TiO$_2$ multilayer electrode; and FIG. 10b shows the oxidation of the PEDOT/TiO$_2$ multilayer electrode.

Figure 11A:
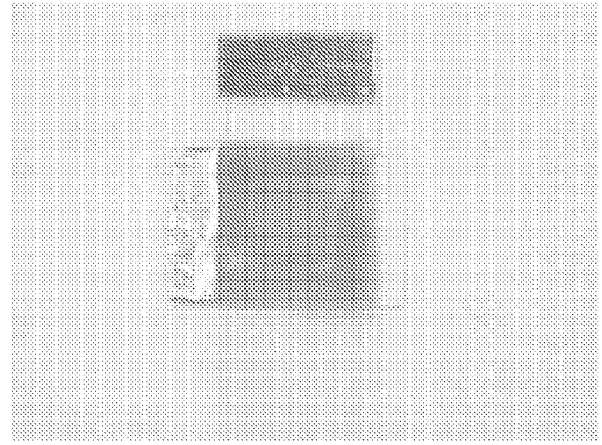
FIG. 11 shows photographs of electrochromic devices of the invention at open circuit potential (FIG. 11a); at 0.5 V (FIG. 11b); and at −0.9 V (FIG. 11c).
Figure 11B:
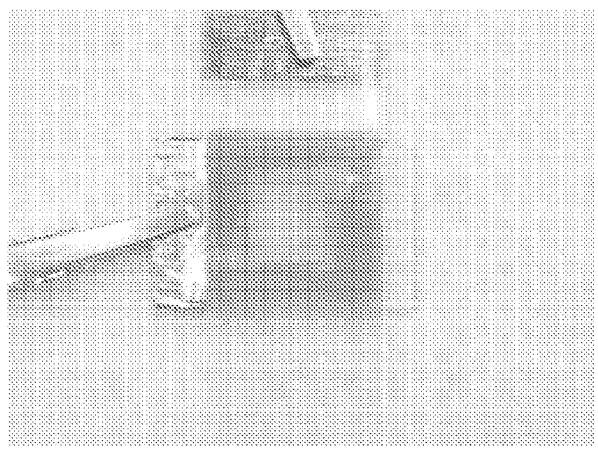
Figure 11C:
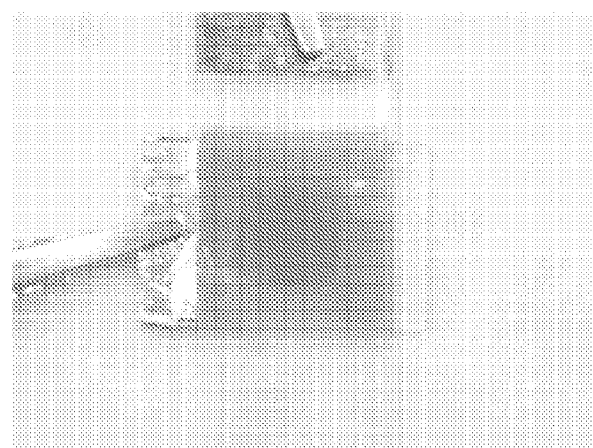

FIGS. 11a, 11b, and 11c show pictures of the electrochromic device. FIG. 11a shows the device at open circuit. A blue color was seen due to the inherent faintly blue color of PEDOT. FIG. 11b shows a picture of the electrochromic device at 0.5 V. The PEDOT is oxidized to a colorless state, thus only the white color from the reflective layer is exposed. FIG. 11c shows a picture of the electrochromic device at −0.9 V. The PEDOT is now reduced to the normal blue state and the viologen is reduced to the blue radical cation state.

Thus, embodiments of electrochromic devices based on layer by layer deposition are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An electrode comprising:
   a substrate having a first and a second surface;
   a conductive layer;
   a multilayer structure comprising alternating layers of at least one polymer layer and at least one layer comprising a dispersion of electroactive chemical bound nanoparticle;
   wherein the conductive layer is disposed on the second surface of the substrate, and the multilayer structure is disposed on the conductive layer.

2. The electrode according to claim 1, wherein a first polymer layer of the multilayer structure is disposed directly on the conductive layer.

3. The electrode according to claim 1, wherein a first electroactive chemical bound nanoparticle layer of the multilayer structure is disposed directly on the conductive layer.

4. The electrode according to claim 1, wherein the nanoparticles comprise nanoparticles having at least two different average sizes.

5. The electrode according to claim 1, wherein the nanoparticles are titanium dioxide.

6. The electrode according to claim 1, wherein the electroactive chemical is a ruthenium (II) complex, polyaniline, polypyridyl complex, a viologen, or a derivative thereof.

7. The electrode according to claim 1, wherein the multilayer structure is from 3 to 12 micrometers thick.

8. The electrode according to claim 1, wherein the substrate is flexible.

9. The electrode according to claim 1, wherein the average pore size of the at least one layer comprising a dispersion of electroactive chemical bound nanoparticle layer is greater than 5 nm.

10. The electrode according to claim 1, wherein the polymer of the at least one polymer layer is polyacetylene, poly(para-phenylene)(PPA), poly(para-phenylene-vinylene) (PPV), polypyrrole, polythiophene, polyaniline, polyfluorene, poly(3-hexyl-thiophene), polynaphthalene, poly(p-phenylene sulfide), poly(3,4-alkylendioxythiophene) (PXDOT), or derivatives thereof.

11. The electrode according to claim 1, wherein the at least one layer comprising dispersed electroactive chemical bound nanoparticles is formed from a dispersion comprising nanoparticles having an average size from 5 nm to 50 nm; and at least one electroactive chemical, wherein the electroactive chemical binds to the surface of the nanoparticles, the dispersion includes agglomerates of the electroactive chemical bound nanoparticles, and a majority of the agglomerates have an average diameter that is not greater than 1 micrometer.

12. The electrode according to claim 11, wherein the dispersion comprises 50 wt-% or less of nanoparticles.

13. The electrode according to claim 11, wherein the majority of the agglomerates have an average diameter that is less than 100 nm.

14. An electrochromic article comprising:
   a) an electrode according to claim 1; and
   b) an electrolyte layer disposed on the electrode.

15. The electrochromic article according to claim 14 further comprising a release layer disposed on the electrolyte layer.

16. The electrochromic article according to claim 14 further comprising a counter electrode disposed on the electrolyte layer.

17. The electrochromic article according to claim 16, wherein the counter electrode comprises antimony doped zinc oxide nanoparticles.

18. The electrochromic article according to claim 16 further comprising a reflective layer disposed between the counter electrode and the electrode.

19. The electrochromic article according to claim 18, wherein the reflective layer is a flexible reflective porous membrane.

20. The electrochromic article according to claim 19, wherein the reflective porous membrane comprises at least one polymer, and at least one reflective particle.

21. The electrochromic article according to claim 19, wherein the reflective porous membrane is from 20 μm to 100 μm thick.

* * * * *

UNITED STATES PATENT AND TRADEMARK OFFICE
CERTIFICATE OF CORRECTION

PATENT NO. : 7,764,416 B2
APPLICATION NO. : 11/566541
DATED : July 27, 2010
INVENTOR(S) : Junjun Wu It is certified that error appears in the above-identified patent and that said Letters Patent is hereby corrected as shown below:

Page 2
Column 1 (Other Publications); Line 6, Delete "Macromelcules," and insert
-- Macromolecules, --, therefor.
Column 2 (Other Publications); Line 33, Delete "Electrchromism" and insert
-- Electrochromism --, therefor.
Column 2 (Other Publications); Line 35, Delete "Polmeric" and insert -- Polymeric --, therefor.
Column 2 (Other Publications); Line 38, Delete "Polyelectrolyes" and insert
-- Polyelectrolytes --, therefor.

Column 3
Line 56; Delete "thereof," and insert -- thereof; --, therefor.
Line 59; Delete "stochiometric" and insert -- stoichiometric --, therefor.

Column 7
Line 11; Delete "and or" and insert -- and/or --, therefor.

Column 9
Line 38; Delete "(PPropOT-Me$_2$)." and insert -- (PProDOT-Me$_2$). --,
therefor.

Column 15
Line 36; Delete "inkjet" and insert -- ink jet --, therefor.

Column 20
Line 51; Delete "TiO2" and insert -- TiO$_2$ --, therefor.
Line 52; Delete "TiO2/" and insert -- TiO$_2$/ --, therefor.
Line 65; Delete "P115" and insert -- P15 --, therefor.

Signed and Sealed this

Twelfth Day of October, 2010

David J. Kappos
*Director of the United States Patent and Trademark Office*